United States Patent
Parker et al.

(10) Patent No.: US 10,885,691 B1
(45) Date of Patent: Jan. 5, 2021

(54) MULTIPLE CHARACTER MOTION CAPTURE

(71) Applicant: Electronic Arts Inc., Redwood City, CA (US)

(72) Inventors: Jason Parker, Winter Garden, FL (US); Michael Hoag, Maitland, FL (US); Nelson Yu, Altamonte Springs, FL (US); Brian T. Murray, Winter Park, FL (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 16/184,865

(22) Filed: Nov. 8, 2018

(51) Int. Cl.
*G06T 13/40* (2011.01)
*G06T 7/246* (2017.01)
*G06T 7/00* (2017.01)
*G06T 7/73* (2017.01)

(52) U.S. Cl.
CPC .............. *G06T 13/40* (2013.01); *G06T 7/246* (2017.01); *G06T 7/73* (2017.01); *G06T 7/97* (2017.01); *G06T 2207/10016* (2013.01); *G06T 2207/30196* (2013.01)

(58) Field of Classification Search
None
See application file for complete search history.

(56) References Cited

U.S. PATENT DOCUMENTS

| 4,631,676 A | * | 12/1986 | Pugh | A61B 5/1038 348/77 |
| 2010/0027961 A1 | * | 2/2010 | Gentile | G06T 5/50 386/278 |
| 2015/0019657 A1 | * | 1/2015 | Sakai | H04L 12/1831 709/206 |
| 2015/0178953 A1 | * | 6/2015 | Gao | G06F 17/2765 345/681 |
| 2019/0102949 A1 | * | 4/2019 | Sheftel | G06T 19/006 |

* cited by examiner

*Primary Examiner* — Frank S Chen
(74) *Attorney, Agent, or Firm* — McDermott Will & Emery LLP

(57) ABSTRACT

Various aspects of the subject technology relate to systems, methods, and machine-readable media for motion capture. The method includes obtaining a first video with at least one actor, the first video including a first set of movements of the at least one actor. The method also includes obtaining a second video with the at least one actor, the second video including a second set of movements of the at least one actor, the second set of movements correlating with the first set of movements. The method also includes combining the first video with the second video to obtain a combined video, the combined video including the first set of movements and the second set of movements, the first set of movements displayed as outlines.

21 Claims, 15 Drawing Sheets

MULTIPLE CHARACTER MOTION CAPTURE

TECHNICAL FIELD

The present disclosure generally relates to motion capture, and more particularly to motion capture of multiple characters.

BACKGROUND

Recent advances in computing technology have allowed video game developers and publishers to provide increasingly realistic character representations within a video game. Typically, groups of individuals (e.g., actors, sports players, etc.) are brought into a production studio to capture their movements, and character models are generated using the captured movements. Traditional motion capture systems require intensive coordination between large groups of individuals, which leads to inaccuracies in the captured movements over multiple motion capture shooting cycles.

SUMMARY

The subject disclosure provides for creating realistic video game scenes by coordinating motion capture of a small group of individuals over multiple motion capture shooting cycles. The multiple shooting cycles may be tiled together on-set such that it may appear that the group of individuals are interacting with each other without overlaps. The motion capture system provides improved coordination among multiple individuals over multiple motion capture shooting cycles. In this respect, the motion capture system increases the quality of the captured movement data (or raw motion capture data) for producing realistic character interactions at a lower cost.

According to one embodiment of the present disclosure, a computer-implemented method for motion capture is provided. The method includes obtaining a first video with at least one actor, the first video including a first set of movements of the at least one actor. The method also includes obtaining a second video with the at least one actor, the second video including a second set of movements of the at least one actor, the second set of movements correlating with the first set of movements. The method also includes combining the first video with the second video to obtain a combined video, the combined video including the first set of movements and the second set of movements, the first set of movements displayed as outlines.

According to one embodiment of the present disclosure, a system is provided including a processor and a memory comprising instructions stored thereon, which when executed by the processor, cause the processor to perform a method for motion capture. The method includes obtaining a first video with at least one actor, the first video including a first set of movements of the at least one actor. The method also includes obtaining a second video with the at least one actor, the second video including a second set of movements of the at least one actor, the second set of movements correlating with the first set of movements. The method also includes combining the first video with the second video to obtain a combined video, the combined video including the first set of movements and the second set of movements, the first set of movements displayed as outlines.

According to one embodiment of the present disclosure, a non-transitory computer-readable storage medium is provided including instructions (e.g., stored sequences of instructions) that, when executed by a processor, cause the processor to perform a method for motion capture. The method includes obtaining a first video with at least one actor, the first video including a first set of movements of the at least one actor. The method also includes obtaining a second video with the at least one actor, the second video including a second set of movements of the at least one actor, the second set of movements correlating with the first set of movements. The method also includes combining the first video with the second video to obtain a combined video, the combined video including the first set of movements and the second set of movements, the first set of movements displayed as outlines.

According to one embodiment of the present disclosure, a system is provided that includes means for storing instructions, and means for executing the stored instructions that, when executed by the means, cause the means to perform a method. The method includes obtaining a first video with at least one actor, the first video including a first set of movements of the at least one actor. The method also includes obtaining a second video with the at least one actor, the second video including a second set of movements of the at least one actor, the second set of movements correlating with the first set of movements. The method also includes combining the first video with the second video to obtain a combined video, the combined video including the first set of movements and the second set of movements, the first set of movements displayed as outlines.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

Figure 1:
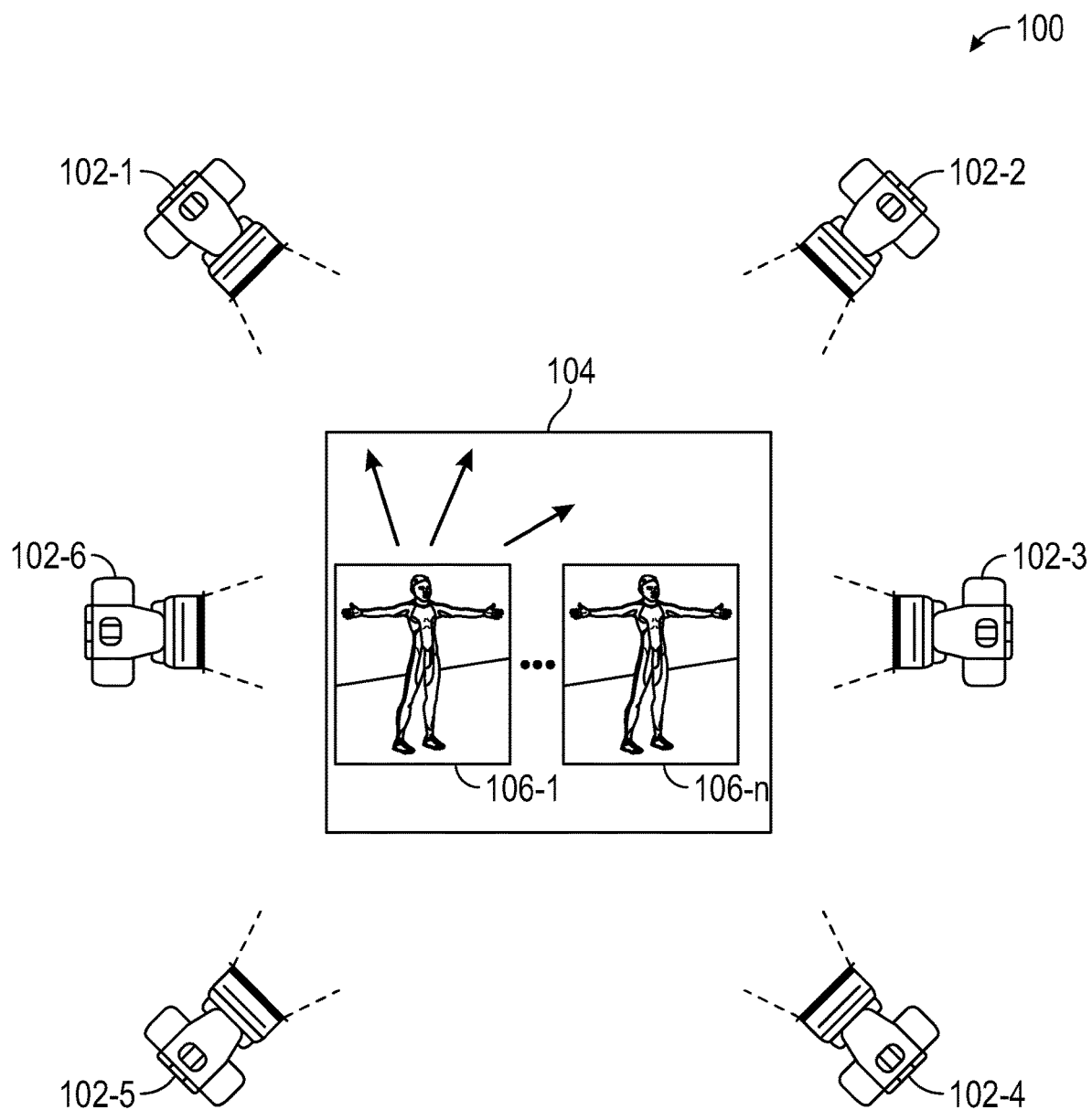
FIG. 1 illustrates an example architecture for motion capture in a computer-operated imaging environment suitable for practicing some implementations of the disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

General Overview

Many video games, including sports titles, use motion capture (or mocap) data as a source of animation for character models. In many interactive environments such as video games, a game engine runs according to rules of the game by taking into account user input and presenting an animated display that is responsive to the user input.

The display of a video game is generally a video sequence presented to a display capable of displaying the video sequence. The video sequence typically includes multiple video frames. By rendering frames in succession according to a sequence order, simulated objects appear to move. The game engine typically generates frames in real-time such as in response to user input.

The simulated objects can be generated entirely from mathematical models describing the shape of the objects (such as arms and a torso described by a set of plane and/or curve surfaces), generated from stored images (such as the face of a famous person), or a combination thereof. It should be noted that if a game engine (or more specifically, a rendering engine that is part of the game engine or used by the gamed engine) has data as to where each object or portion of a flexible object is in a scene, the frame for that scene can be rendered using standard rendering techniques so the more relevant aspect of a game is how to determine where each object is in the scene so that the rendered video sequence is appropriate.

The disclosed system addresses a problem in traditional motion capture systems tied to computer technology, namely the technical problem of capturing motion capture data of several individuals simultaneously. The disclosed system solves this technical problem by providing a solution also rooted in computer technology, namely, by coordinating movements between the several individuals through several motion capture shooting cycles and combining video data of the shooting cycles.

The disclosed subject technology further provides improvements to the functioning of the computer itself because it reduces costs and increases editing efficiency. Specifically, a reduction in individuals utilized to simulate multiple characters allows for improved coordination and capture of movement during multiple motion capture shoot cycles. Additionally, video data may be edited on-set, which reduces post-processing costs and improves efficiency.

As used herein, the term "frame" generally refers to an image of a video sequence. In some systems, such as interleaved displays, the frame may include multiple fields or more complex constructs, but generally a frame represents a view into a computer-generated scene at a particular time or short time window. For example, with 60 frame-per-second video, if one frame represents the scene at t=0, then the next frame would represent the scene at t=1/60 second. In some cases, a frame may represent the scene from t=0 to t=1/60, but in a simple case, the frame is a snapshot in time.

As used herein, the term "scene" may include simulated objects that are positioned in a world coordinate space within a view pyramid, view rectangular prism or other shaped view space. A scene may include several objects with some of the objects being animated in that the objects appear to move either in response to game engine rules or user input. For example, in a basketball game, a character for one of the basketball players may shoot a basket in response to user input, while a defending player will attempt to block the shooter in response to logic that is part of the game rules (e.g., a machine-learning component of the game rules may include a rule that defenders block shots when a shot attempt is detected) and when the ball moves through the net, the net moves in response to the ball. Animated objects are typically referred to herein generically as characters and in specific examples, such as animation of a football, soccer, baseball, basketball, or other sports game. The characters are typically simulated players in the interactive environment. In many cases, the characters correspond to real-world sports figures, and those real-world sports figures may have contributed motion capture data for use in animating their corresponding character. In this respect, the corresponding animated character may be an avatar of the real-word sports figure. In some aspects, interactive environment players and characters may be non-human, simulated robots or other character types.

As used herein, the term "animation" generally refers to the process of generating successive scenes such that when the corresponding frames are displayed in sequence, characters or other objects in the scene appear to move.

Example System Architecture

FIG. 1 illustrates a diagram of a video capture system 100 for capturing multiple videos of one or more live events from multiple camera angles. As shown, the video capture system 100 includes six cameras 102-1 to 102-6 (individually, camera 102; collectively, cameras 102), each positioned at a different angle relative to a target area 104. The target area 104 may comprise, for example, a sporting venue (e.g., a football field) or other type of venue supporting live events (e.g., a music concert venue). The cameras 102 may comprise, for example, HD (high-definition), 4K, and/or UHD video cameras. It will be appreciated that although six cameras 102 are shown, other implementations may include a greater or lesser number of such cameras 102 and/or arranged in a similar or different configuration, including at different heights and/or across more than one venue. In one or more implementations, the video capture system 100 includes an optical camera system in addition to the video cameras (e.g., 102).

The cameras 102 may capture videos of one or more target participants 106-1 to 106-n (individually, target participant 106; collectively, target participants 106) in the target area 104 from multiple camera angles. The target participants 106 may comprise, for example, players in a sporting event (e.g., football players) or other type of participant in a live event (e.g., musician). In some implementations, the cameras 102 may capture multiple videos of the target participant 106-1 from multiple camera angles over a predetermined amount of time, e.g., one or more games, seasons, etc., and the captured video may be combined into single video, or set(s) of video, associated with the target participant 106-1.

In some implementations, the target participants 106 may be identifying by identifying attributes, such as player name, player number, and so forth. In some aspects, the target participants 106 are outfitted with reflective markers that optically interact with the cameras 102. Alternatively, the target participants 106 may be outfitted with one or more sensors for supporting identifying his or her position and/or movement within the target area 104 of the videos. For example, the sensors may include RFID (radio-frequency identification) sensors. These and other identifying attributes may be included in metadata associated with the video, as discussed further below.

Example System for Capturing Likeness of Target Participant

Figure 2:
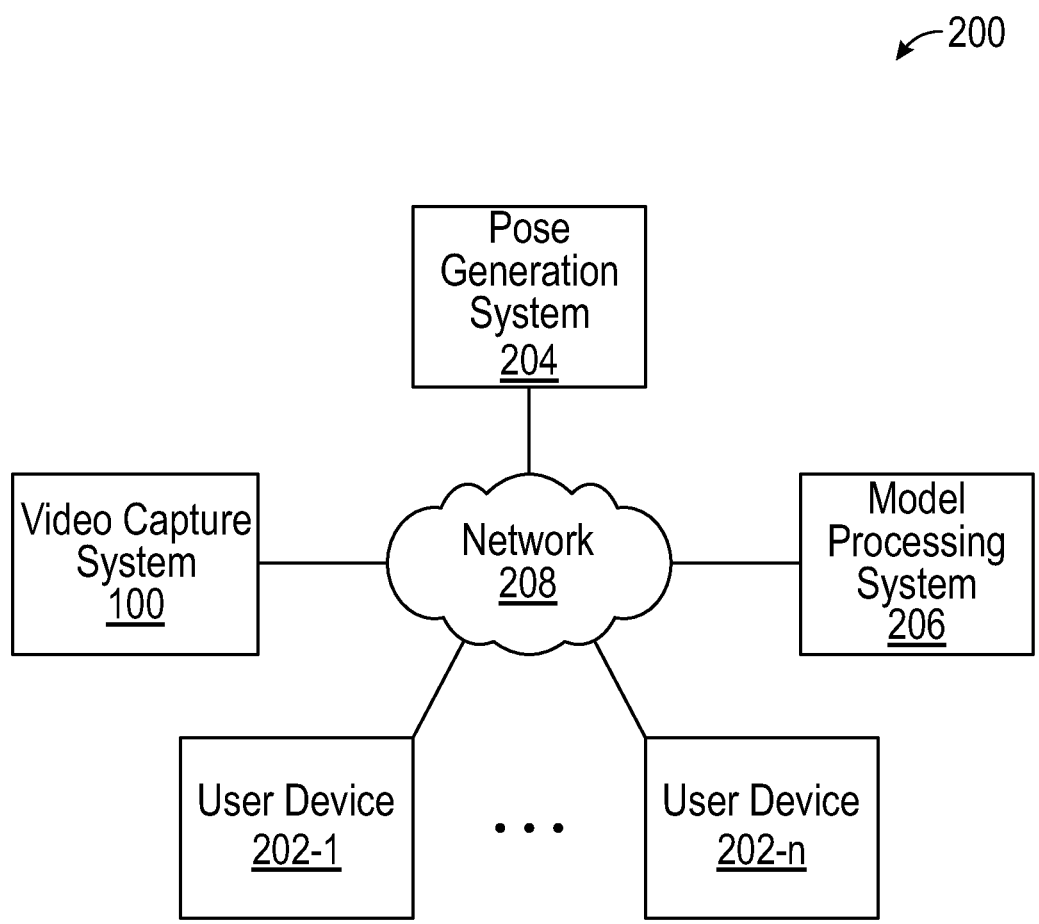
FIG. 2 conceptually illustrates an example of a motion capture system for capturing a likeness of a target participant according to certain aspects of the disclosure.

FIG. 2 illustrates a diagram of a system 200 for capturing a likeness of a target participant (e.g., target participant 106-1) based on videos recorded during one or more live events from multiple camera angles (e.g., by the cameras 102). Generally, likeness may include physical characteristics (e.g., height, weight, body dimensions), skeletal characteristics (e.g., posture, joint angles), and movement characteristics of a target participant. In some implementations, the system 200 may generate graphic datasets based on the likeness of the target participant and store and/or transmit the graphic datasets to assist in rendering gameplay of a video game of the player representing the target participant. In a specific implementation, the system 200 includes user devices 202-1 to 202-n (collectively, the user devices 202), a pose generation system 204, a model processing system 206, the video capture system 100, and a communications network 208. In various implementations, one or more digital devices may comprise the user devices 202, the pose generation system 204, the model processing system 206, and the communications network 208. It will be appreciated that a digital device may be any device with a processor and memory, such as a computer.

The pose generation system 204 is configured to generate one or more sets of poses (e.g., three-dimensional poses) of a target participant (e.g., target participant 106-1) from the videos captured by one or more cameras (e.g., the cameras 102). In some implementations, a pose of a target participant is generated from one or more frames of one or more videos, and for each of the multiple cameras angles. The individual poses can be aggregated into one or more sets of poses associated with a target participant and associated with a movement type and/or game stimulus. In some implementations, a user (e.g., an administrator) may tag a set of poses with a particular movement type and/or game stimulus, and/or the set of poses may be tagged automatically by the pose generation system, e.g., based on a comparison with a previously tagged set or sets of poses. In some implementations, the user can identify a time range in video clips corresponding to a particular movement type and/or a particular game stimulus. The video clips may be used to generate the set of poses corresponding to the movement type and/or game stimulus. In various implementations, a movement type may include, for example, standing, gait, walk, run, jump, spin, and so forth, as discussed further below. A game stimulus may include, for example, winning, losing, upset, fatigue (e.g., near end of game, after a long run, etc.), fumble, etc.

The model processing system 206 is configured to generate graphical data based on one or more sets of poses to capture a likeness of a target participant (e.g., target participant 106-1) performing a particular movement and/or in response to a particular game stimulus. In some implementations, the model processing system 206 stores one more character models (e.g., 3D character models). The character models may include physical, skeletal, and/or movement characteristics. The model processing system 206 may use the character models to generate customized character models, e.g., character models having values more closely reflecting a likeness of the target participant when performing a movement, or to generate graphic information (e.g., joint angles, postural information, motion information) that can be provided to the user device for replicating the likeness of the players during gameplay.

For example, a default sequence of poses may represent a default character model performing a default jump movement when be is fatigued. The default sequence of poses of the default character model may be adjusted based on a comparison of the default poses with set of poses to generate the customized character model or graphic data to include the jump movement of the target participant when the target participant is fatigued. The customized character model or graphic data set for the jump movement of the target participant may be used to render the game character with the likeness of the real person. It will be appreciated that the graphic data may be the customized character model.

In some implementation, the pose generation system 204 and/or the model processing system 206 may comprise hardware, software, and/or firmware. The pose generation system 204 and/or the model processing system 206 may be coupled to or otherwise in communication with a communication network 208. In some implementations, the pose generation system 204 and/or the model processing system 206 may comprise software configured to be run (e.g., executed, interpreted, etc.) by one or more servers, routers, and/or other devices. For example, the pose generation system 204 and/or the model processing system 206 may comprise one or more servers, such as a windows 2012 server, Linux server, and the like. Those skilled in the art will appreciate that there may be multiple networks and the pose generation system 204 and/or the model processing system 206 may communicate over all, some, or one of the multiple networks. In some implementations, the pose generation system 204 and/or the model processing system 206 may comprise a software library that provides an application program interface (API). In one example, an API library resident on the pose generation system 204 and/or model processing system 206 may have a small set of functions that are rapidly mastered and readily deployed in new or existing applications. There may be several API libraries, for example one library for each computer language or technology, such as, Java, .NET or C/C++ languages.

The user devices 202 may include any physical or virtual digital device that can execute a video game application (e.g., football game simulation). For example, a user device 202 may be a video game console, laptop, desktop, smartphone, mobile device, and so forth. In some implementations, executing the video game application on a user device 202 may comprise remotely accessing a video game application executed on another digital device (e.g., another user device 202, server, and so forth).

While many user devices 202 may be different, they may share some common features. For example, the user devices 202 may have some method of capturing user input such as a keyboard, remote control, touchscreen, joystick, or the like. Different user devices 202 may also have some method of displaying a two-dimensional or three-dimensional image using a display such as a TV screen (e.g., LED, LCD, or OLED) or touchscreen. The user devices 202 may have some form of processing CPU, although the capability often widely varies in terms of capability and performance.

In various implementations, one or more users (or, "players") may utilize each user device 202 to play one or more games (e.g., a sports game, a turn-based game, a first-person shooter, etc.). Each user device 202 may display a user interface associated with the desired game. The user interface may be configured to receive user selections (e.g., user input) for gameplay. For example, there may be any number of menus that provide opportunity for player selection via buttons, radio buttons, check boxes, sliders, text fields, selectable objects, moveable objects, and/or the like.

The content of the user interface may be generated and/or selected based on game rules and/or a current game state. Game rules and the current game state may dictate options from which the player may choose. Once the player provides selection(s), in some implementations, a simulation may be performed to determine the result of the player selection(s) in the context of game play (e.g., utilizing the current game state). In some implementations, the simulation is conducted locally (e.g., a player utilizing the user device 202-1 inputs selection(s) and the user device 202-1 performs the simulation) based on the game rules. In various implementations, the simulation may be performed by another digital device. For example, the user device 202-1 may provide the selection(s) and/or the current game state to a remote server (not shown) via the communication network 208. The remote server may perform the simulation based on the game rules, the player selection(s), and/or the current game state.

Once the simulation results are obtained, whether performed locally or remotely, the simulation results need to be rendered, either locally or remotely. The rendering engine, which may be on the user device 202, can use the customized character models to render the likeness of the target participants during gameplay. As described in more detail below, the rendering engine will select graphical datasets in order to render the simulation results. The rendering engine may select different graphical datasets to render the different gameplay clips so as to create a temporally accurate rendition of the likeness of the target participant, and so as to create variety in the movement of the target participant, e.g., so that the player representing the target participant uses the different jump sequences that the target participant uses in real life. The rendering engine may use the customized character models to generate the entire rendering of gameplay event, portions of the rendering of the gameplay event, and/or extra-gameplay clips.

In some implementations, the communications network 208 represents one or more network(s). The communications network 208 may provide communication between the user devices 202, the pose generation system 204, the model processing system 206 and/or the video capture system 100. In some examples, the communication network 208 comprises digital devices, routers, cables, and/or other network topology. In other examples, the communication network 208 may be wired and/or wireless. In some implementations, the communication network 208 may be another type of network, such as the Internet, that may be public, private, IP-based, non-IP based, and so forth.

It will be appreciated that, although the system herein is being described with regard to capturing physical, skeletal and movement characteristics of a target participant, the system herein can be used in a similar manner to capture facial and other micro-expression characteristics of the target participant, possibly in relation to game stimuli. It may be necessary to have cameras of sufficiently high definition capable of capturing the facial and/or micro-expressions at a distance, or close-up cameras, e.g., on a target participant's helmet, to capture the facial and/or micro-expressions.

In traditional motion capture systems, simulating a scene having many characters involves multiple takes (e.g., motion capture cycles) with multiple actors. This is because in order to reduce costs, rather than having an actor for each character to be simulated, (e.g., 53 actors for 53 football players in a football simulation game), motion is captured for a smaller group of actors (e.g., around six actors) over multiple takes. However, it is difficult and time-consuming to coordinate movements of the actors over multiple takes without having actors overlapping with each other. It is also expensive and time-consuming to edit the takes to remove any overlaps. Therefore, there is a need for improved motion capture of multiple characters that overcomes these deficiencies.

Example System for Multiple Character Motion Capture

Aspects of the present disclosure provide for improved motion capture of multiple characters. Motion capture data from a previous take is duplicated such that actors may act out a scene while also viewing the previous take in real time. This allows for the actors to coordinate their movements with movements in the previous take.

FIGS. 3A-3G illustrate successive screen captures 300a-300g of outputs of a system for multiple character motion capture, according to certain aspects of the disclosure. The system may be substantially similar to systems 100 and 200 described above in relation to FIGS. 1 and 2. The screen captures 300a-300g may be from successive moments in time 320a-320g. The screen captures 300a-300g may each include a first view 302, a second view 304, a third view 306, and a fourth view 308 of a scene. It is understood that although four views 302-308 are shown, views from additional viewpoints may be included as well.

The screen captures 300a-300g may be in relation to a scene where a first character 310-1 views an object (e.g., a smartphone, video player, etc.) and passes the object to a second character 310-2, and both characters walk away, where both the first character 310-1 and the second character 310-2 are portrayed by the same actor 310 through successive takes.

According to an aspect, motion capture data may include the actor 310 portraying the first character 310-1 during a first take to capture a first set of movements. For example, referring to FIGS. 3A-3G in succession, the movements of the actor 310 were recorded during a first take where the first character 310-1 views an object 350 (FIG. 3A), shows the object 350 (FIG. 3B), puts the object 350 down (FIG. 3C), and walks away (FIGS. 3D-3G).

The motion capture data may include the actor 310 portraying the second character 310-2 during a second take to capture a second set of movements. For example, referring to FIGS. 3A-3G in succession, the movements of the actor 310 were recorded during the second take where the second character 310-2 is sitting (FIG. 3A), looking at the object 350 (FIG. 3B), picking up the object 350 (FIG. 3D), reacting to the object 350 (FIG. 3E), and walking away (FIGS. 3F-3G).

Figure 3A:
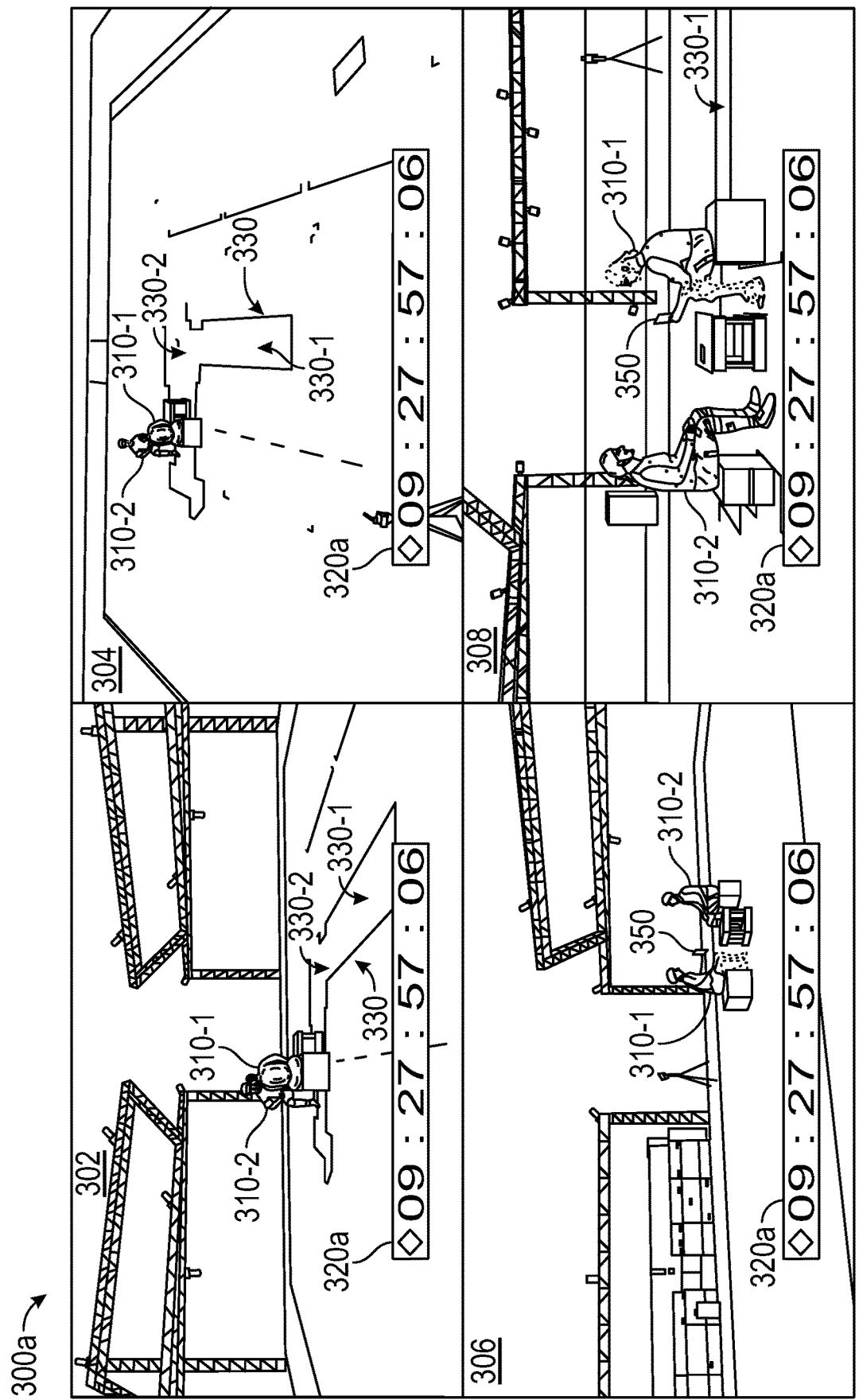
FIGS. 3A-3G illustrate successive screen captures of outputs of a system for multiple character motion capture, according to certain aspects of the disclosure.
Figure 3B:
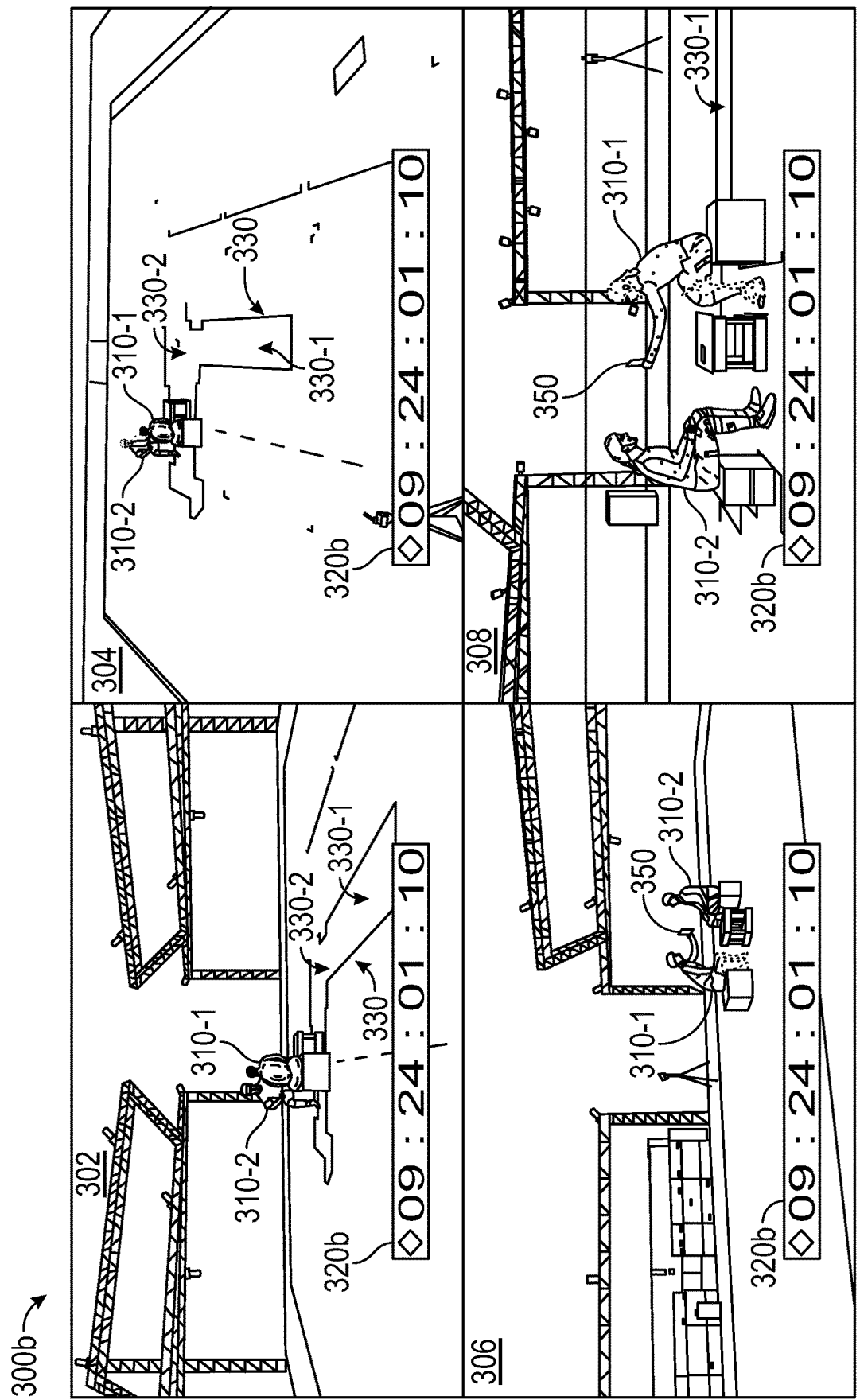
Figure 3C:
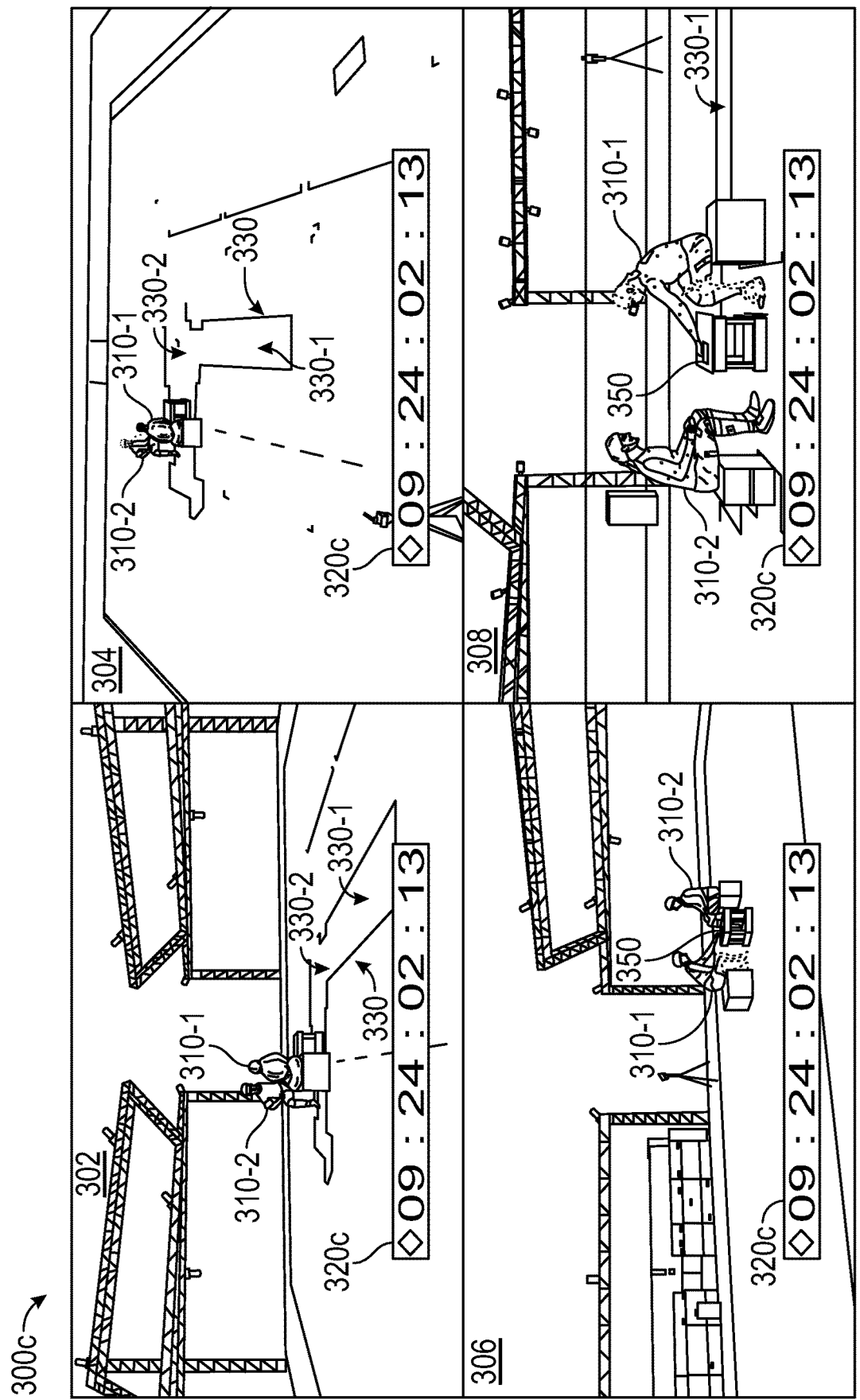
Figure 3D:
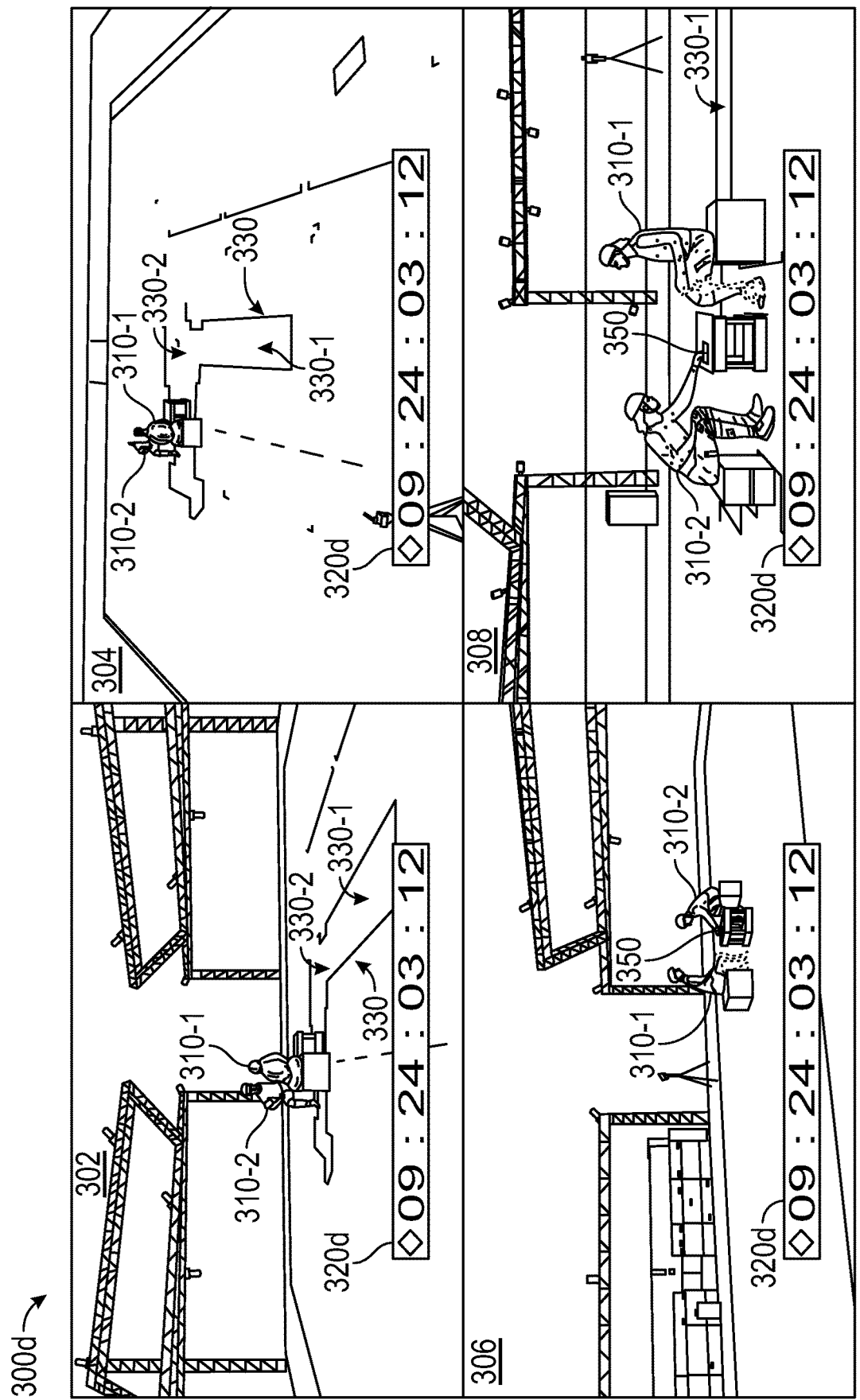
Figure 3E:
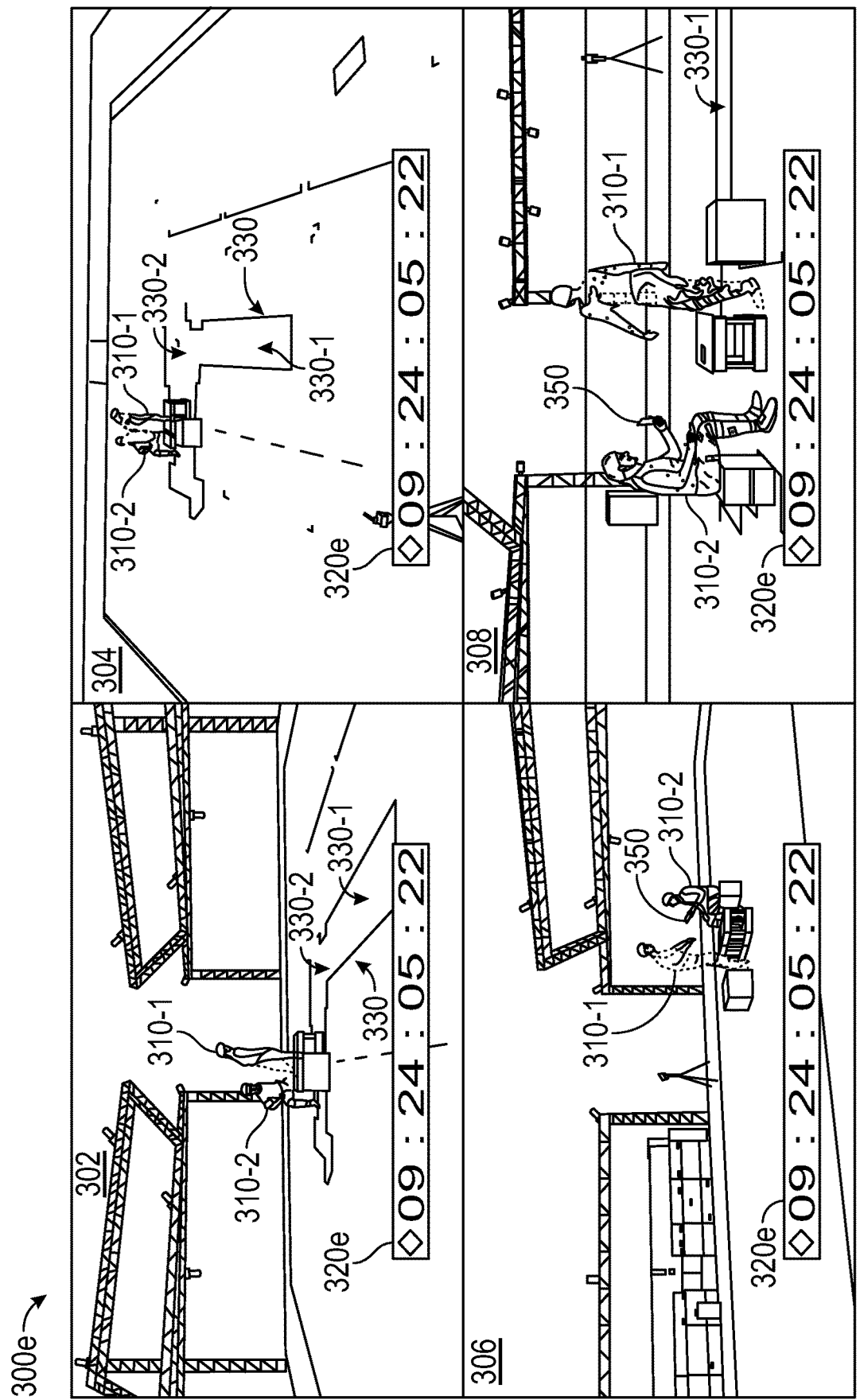
Figure 3F:
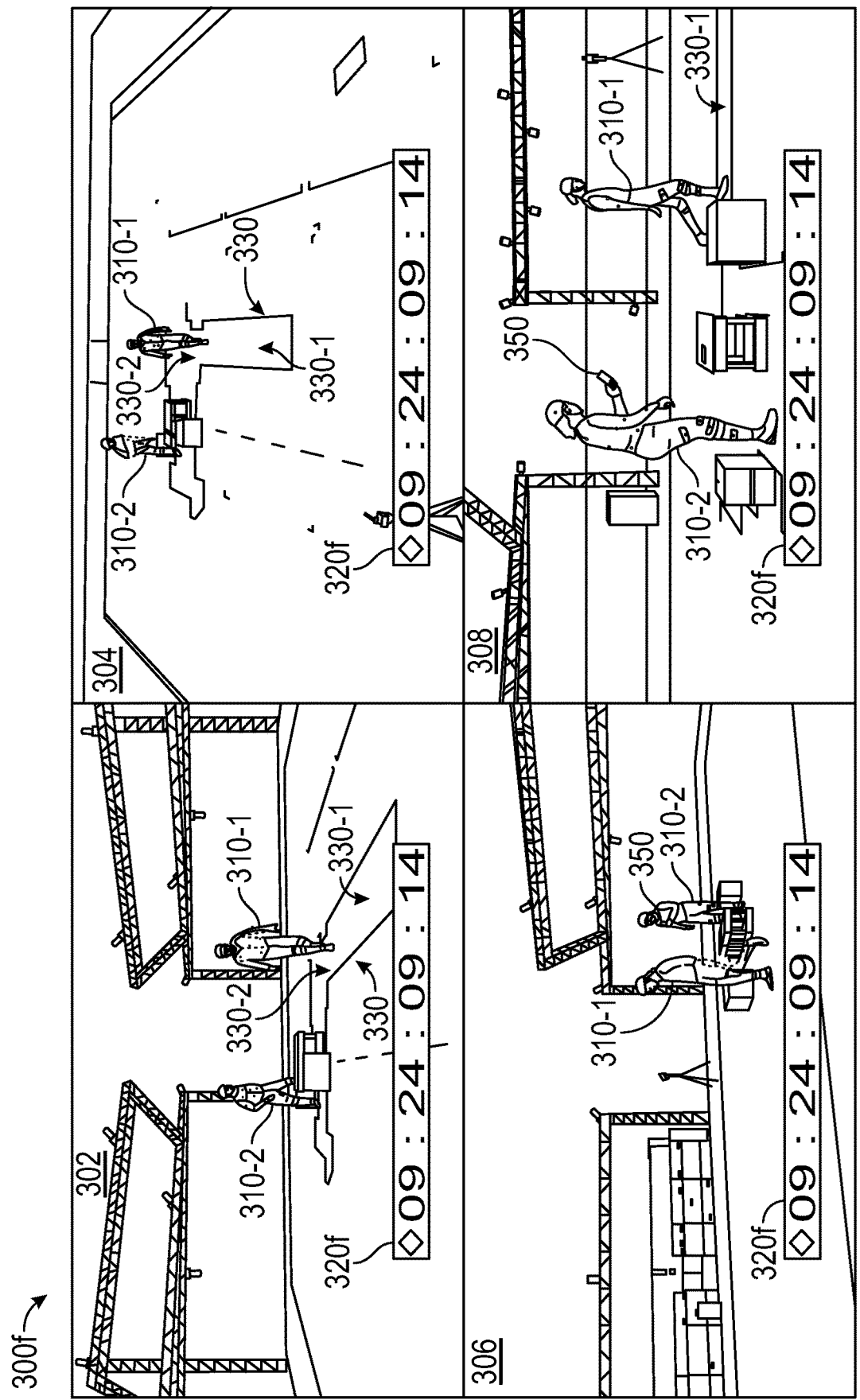
Figure 3G:
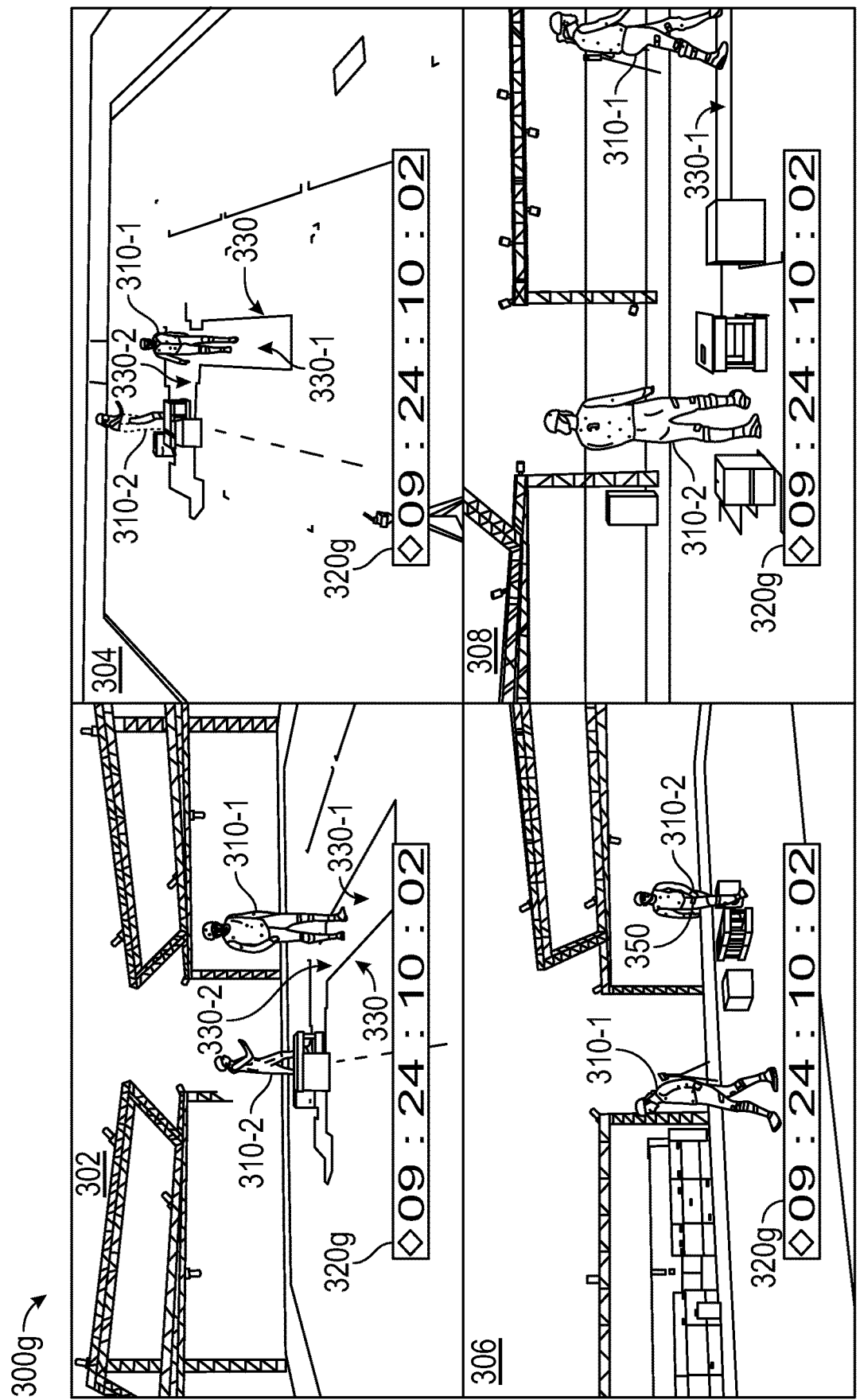

When combined together, the first take and the second take display a complete scene where the first character 310-1 views the object 350 while the second character 310-2 is sitting and looking at the first character 310-1 (FIG. 3A), the first character 310-1 shows the object 350 to the second character 310-2 (FIG. 3B), the first character 310-1 puts the object 350 down (FIG. 3C), the second character 310-2 picks the object 350 up (FIG. 3D) and reacts to the object 350 while the first character 310-1 gets up and walks away (FIG. 3E). The second character 310-2 then gets up (FIG. 3F) and walks away (FIG. 3G). For example, the first take and the second take may be combined through tiling.

According to an aspect, the walking paths 330 of the first character 310-1 and the second character 310-2 may not intersect. For example, the first character 310-1 walks along a first marked path 330-1, and the second character 310-2 walks along a second marked path 330-2, such that the paths do not cross.

According to aspects of the present disclosure, movements of the actor 310 from the first take and the second take may be coordinated with each other in real-time. For example, motion capture data from the first take may be displayed (e.g., overlaid) simultaneously with motion capture data from the second take, such that movements of the actor 310 from each take may be compared. In an implementation, a first take includes movements of the first character 310-1, and a second take includes movements of the second character 310-2, as illustrated in FIGS. 3A-3G. The first take and the second take are combined, such that the first character 310-1 is shown as a "ghost" (e.g., in dotted lines, in a see-through manner, as an outline, etc.) and the second character 310-2 is shown as captured. The movements of the first character 310-1 and the second character 310-2 can be compared in real-time, and adjustments can be made either through editing or by filming another take. For example, if movements of the actor 310 from the first and second takes do not match up, then another take may be filmed to correct any mismatches and/or actor overlaps.

According to an aspect, the second take may be recorded in real-time as the actor 310 is portraying the second character 310-2 based on movements of the first character 310-1 in the first take. For example, the first character 310-1 from the first take may be output to a display as a "ghost" (e.g., as an outline of the first character 310-1, as shown in FIGS. 3A-3G) simultaneously as the actor 310 is portraying the second character 310-2 during the second take. In this way, a third party (e.g., a director) may record the second take while also viewing a combined motion capture output of the first character 310-1 interacting with the second character 310-2 in real-time. The third party may then make adjustments based on the combined motion capture output. For example, the third party may determine whether the actor 310 walked through his own "ghost", walked through another character, was looking in the wrong direction, etc. According to an aspect, the combined motion capture output may be displayed on a camera output screen in real-time while the camera is filming the take.

As described herein, the disclosed system allows for an actor 310 to interact with him/herself in a scene with 100% accuracy. For example, the actor 310 handed a phone across a table to him/herself seamlessly. This is because the actor 310 was shown where the phone was being held, where the phone landed, etc., so that the actor 310 could transfer the phone to his/her other self in the next take with perfect accuracy.

Rather than filming multiple takes and blindly guessing at positions and movements of each character and relying on an editing team to fix any errors, the disclosed system allows for real-time editing and adjusting of the actor 310 for improved character coordination in a final combined output of takes. This saves on costs for hiring actors, as captured movements of a few actors may be combined to create a realistic scene of many characters. Additionally, editing time and complexity is reduced, as animators can work with a base of coordinated movements without actor overlaps, which also reduces costs.

Figure 4:
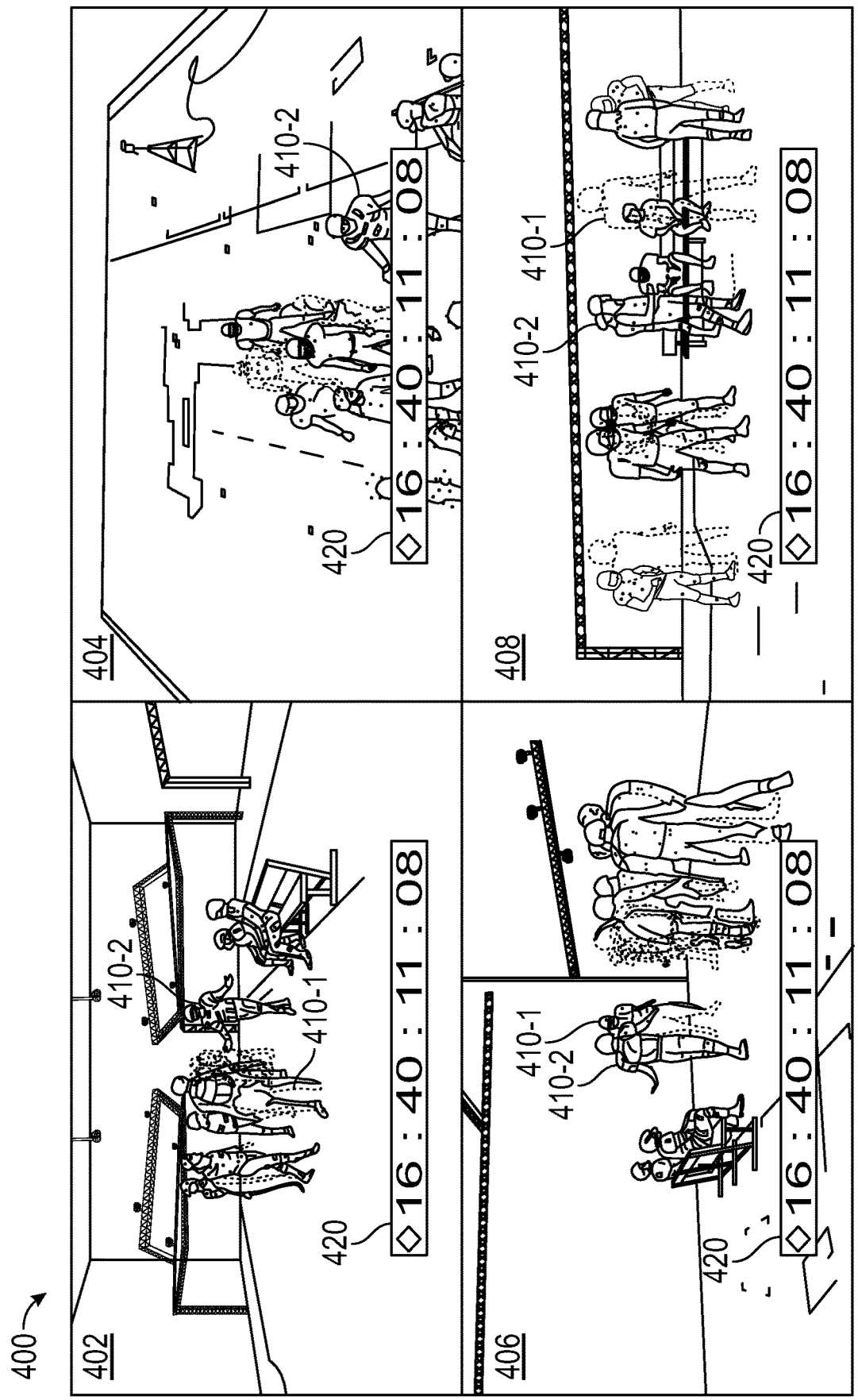
FIG. 4 illustrates an example output of a system for multiple character motion capture, according to certain aspects of the disclosure.

FIG. 4 illustrates an example screen capture 400 of a twelve character sideline scene generated through multiple takes with six actors. The screen capture 400 may be from a moment in time 420. The screen capture 400 includes a first view 402, a second view 404, a third view 406, and a fourth view 408 of a scene. It is understood that although four views 402-408 are shown, views from additional viewpoints may be included as well.

According to an aspect, in a scene from a football simulation game that involves twelve total players, six actors may portray all twelve players. The six actors are recorded in a first take of the scene. During a second take, motion capture data of the first take is duplicated and played in real-time as the six actors are recorded again with movements responsive to the first take. Combining the first take and the second take results in a scene with twelve total players interacting with each other without actors overlapping (e.g., in an identical location in space).

Similar to the above in FIGS. 3A-3G, a first take is overlaid over a second take to include "ghosts" of the actors. For example, character 410-1 (shown in dotted lines) is from a first take, and character 410-2 (shown in solid lines) is from a second take. For example, character 410-1 may be displayed as an outline (e.g., in outline format, see-through, etc.). The same actor 410 may portray both the first character 410-1 and the second character 410-2. Similarly, the other five actors portray the other ten characters. According to an aspect, the same six actors may portray additional characters in a scene as needed.

According to an aspect, a recording of a take may be output to a display for viewing by the actors 410 after each take. The actors 410 can view their positions in space and perform a second take while the first take is played in real-time. The actors 410 can also perform test runs based on the playback of each take prior to filming a subsequent take. Additionally, a third party may determine whether any people walked through another person, walked through their "ghost", the occurrence of intersecting people, timing issues, etc., and make appropriate corrections. As a result, real world behaviors may be captured through organic performances, which are difficult to duplicate by animators.

Figure 5:
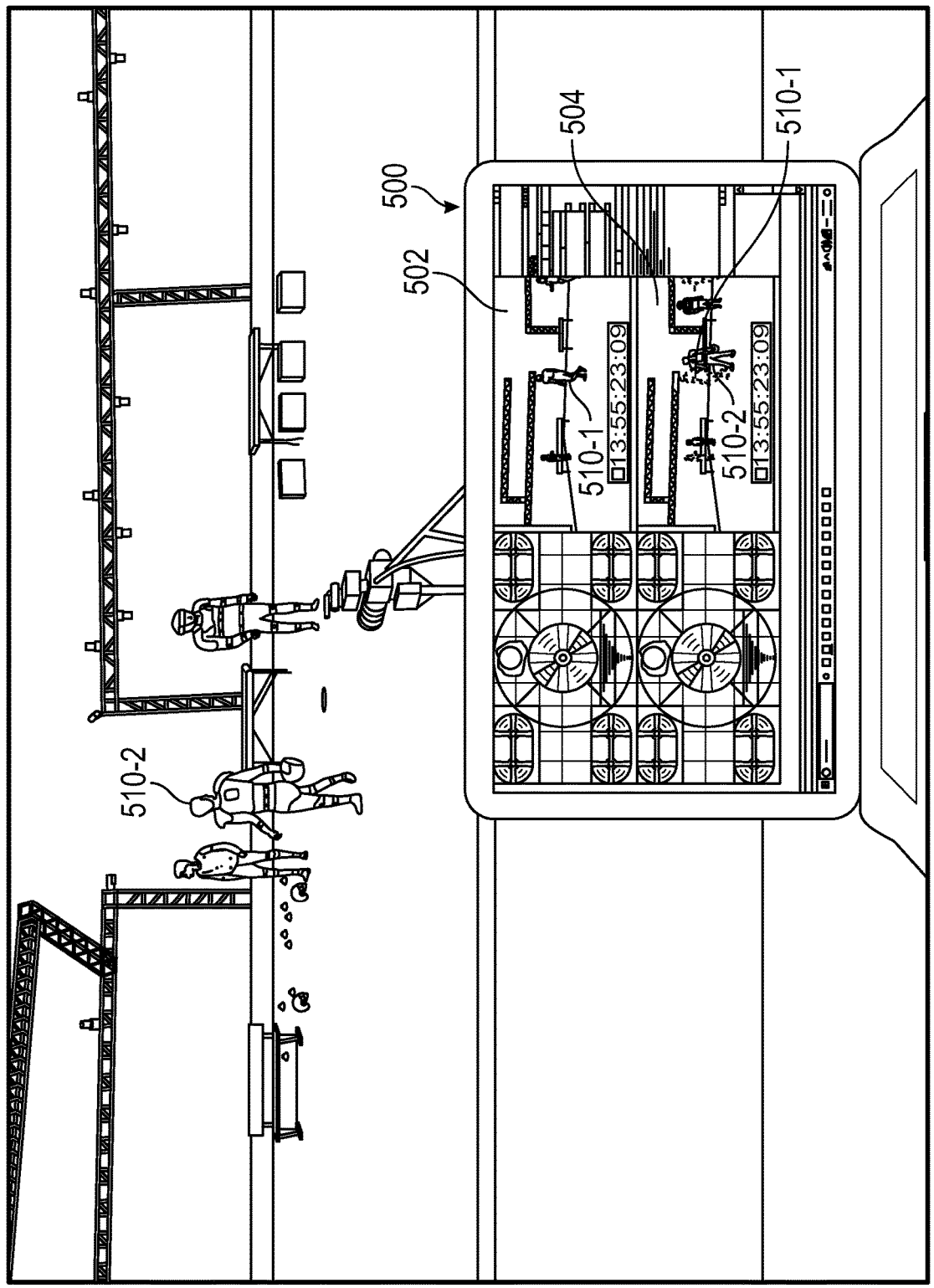
FIG. 5 illustrates an example user interface for multiple character motion capture, according to certain aspects of the disclosure.

FIG. 5 illustrates an example user interface 500 for multiple character motion capture, according to certain aspects of the disclosure. According to an aspect, a third party (e.g., a director) may direct motion capture of actors through the interface 500. The interface 500 may be an application installed in any one of a computer, smartphone, tablet, laptop, etc. The interface 500 may include a first display 502 and a second display. The first display 502 may output a first take, and the second display 504 may output a second take.

According to an aspect of the present disclosure, each of the first display 502 or the second display 504 may display a combination of the first take and the second take. For example, the first display 502 may show a first take with three actors, including a first character 510-1 portrayed by one of the actors. The second display 504 may show a combination of the first take and a second take. The combination may be shown on the second display 504 simultaneously as the second take is being filmed, or may be displayed after the second take is over. For example, the second display 504 shows the three actors, including a second character 510-2 portrayed by the same actor that portrayed the first character 510-1. Both the first character 510-1 and the second character 510-2 are visible on the second display 504, with the first character 510-1 (shown in dotted lines) appearing as a "ghost". The other actors may also be acting against their respective "ghosts" (e.g., outlines), as shown on the second display 504.

According to aspects of the present disclosure, the director can direct the actors while recording, playing back, and/or marking where they want the actors to stand, and also adjusting timings of actions based on previous takes. For example, the director is able to interactively work with footage by scrubbing through a scene frame by frame using the interface 500.

In an implementation the director may mark entrances and exits of actors, and may finalize and add a subsequent take. For example, after filming a first take, the first take is reviewed with the actors through the interface 500. The directed can then have the actors walk through a second take that is based on the first take, before filming a second take. The second take is then reviewed by everyone through the interface 500, and it may be confirmed that there were no issues (e.g., no clipping, quality of acting, etc.). The scene may then be finalized by combining the first take with the second take. The interface 500 may be included on a smartphone or tablet for added mobility and ease of use.

According to an aspect, the director may isolate portions of the takes that include undesirable occurrences, such as actors overlapping, bad acting, etc. For example, the director may choose to eliminate just one person, or an entire stream of motion capture data. The director may also make a note to an animator to delete an actor's data from a scene and/or from certain portions of a scene, such that the animator can ignore that actor's motion capture data. Additional takes may also be done to correct errors.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 6:
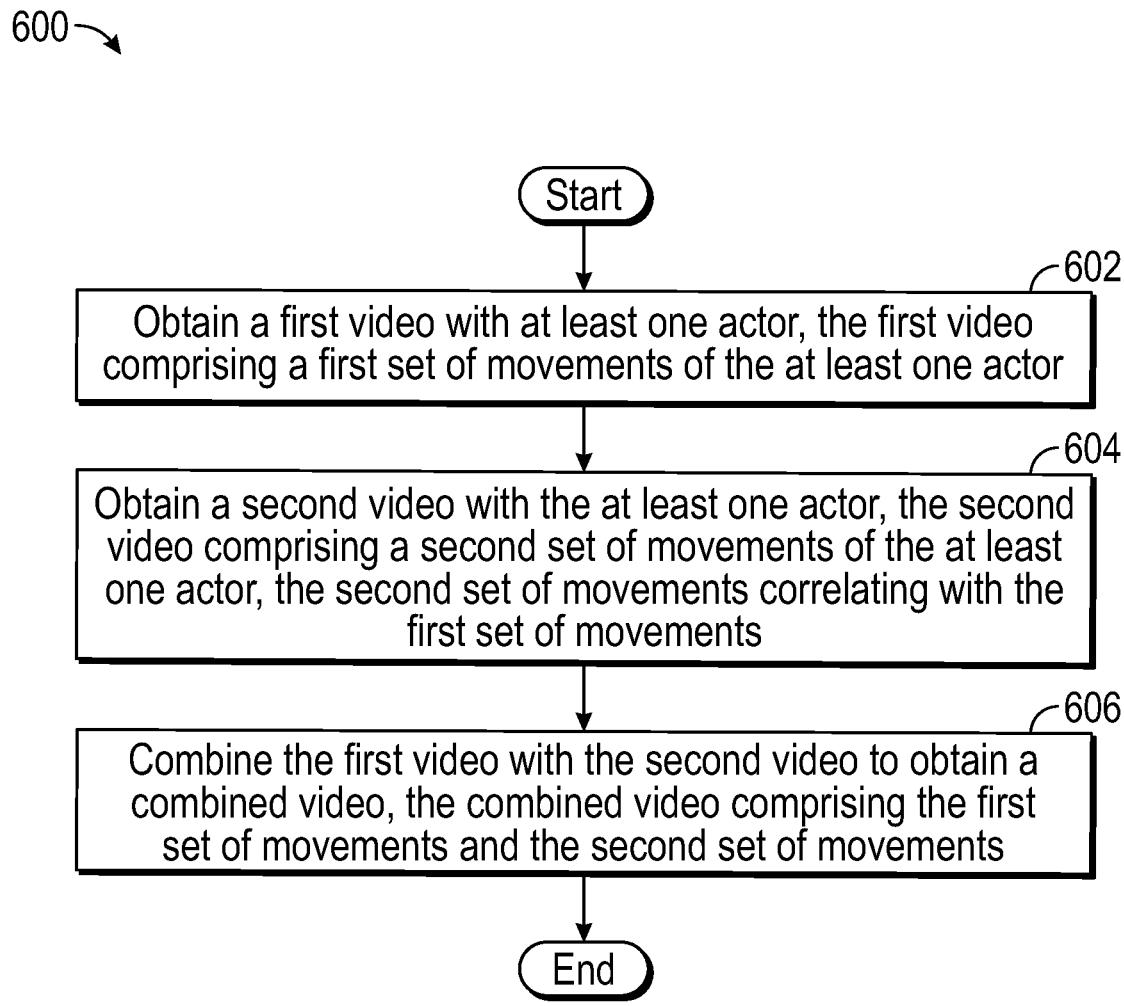
FIG. 6 illustrates an example flow diagram for multiple character motion capture, according to certain aspects of the disclosure.

FIG. 6 illustrates an example flow diagram (e.g., process 600) for multiple character motion capture, according to certain aspects of the disclosure. For explanatory purposes, the example process 600 is described herein with reference to the systems 100 and 200 of FIGS. 1-2. Further for explanatory purposes, the blocks of the example process 600 are described herein as occurring in serial, or linearly. However, multiple blocks of the example process 600 may occur in parallel. In addition, the blocks of the example process 600 need not be performed in the order shown and/or one or more of the blocks of the example process 600 need not be performed. For purposes of explanation of the subject technology, the process 600 will be discussed in reference to FIGS. 1-2.

At block 602, a first video is obtained with at least one actor, the first video including a first set of movements of the actor. At block 604, a second video is obtained with the actor, the second video including a second set of movements of the actor, the second set of movements correlating with the first set of movements. At block 606, the first video is combined with the second video to obtain a combined video, the combined video including the first set of movements and the second set of movements, the first set of movements displayed as outlines.

According to an aspect, the process 600 further includes monitoring the first video and the second video to ensure correlation of the first set of movements with the second set of movements.

According to an aspect, the process 600 further includes tiling the first video with the second video.

According to an aspect, the process 600 further includes obtaining a third video with the actor, the third video including a third set of movements of the actor, the third set of movements correlating with the first set of movements and the second set of movements.

According to an aspect, the process 600 further includes combining the third video with the first video and the second video to obtain the combined video.

According to an aspect, the process 600 further includes adjusting the second set of movements to correlate with the first set of movements.

According to an aspect, the process 600 further includes translating the combined video into an animated sequence.

Hardware Overview

Figure 7:
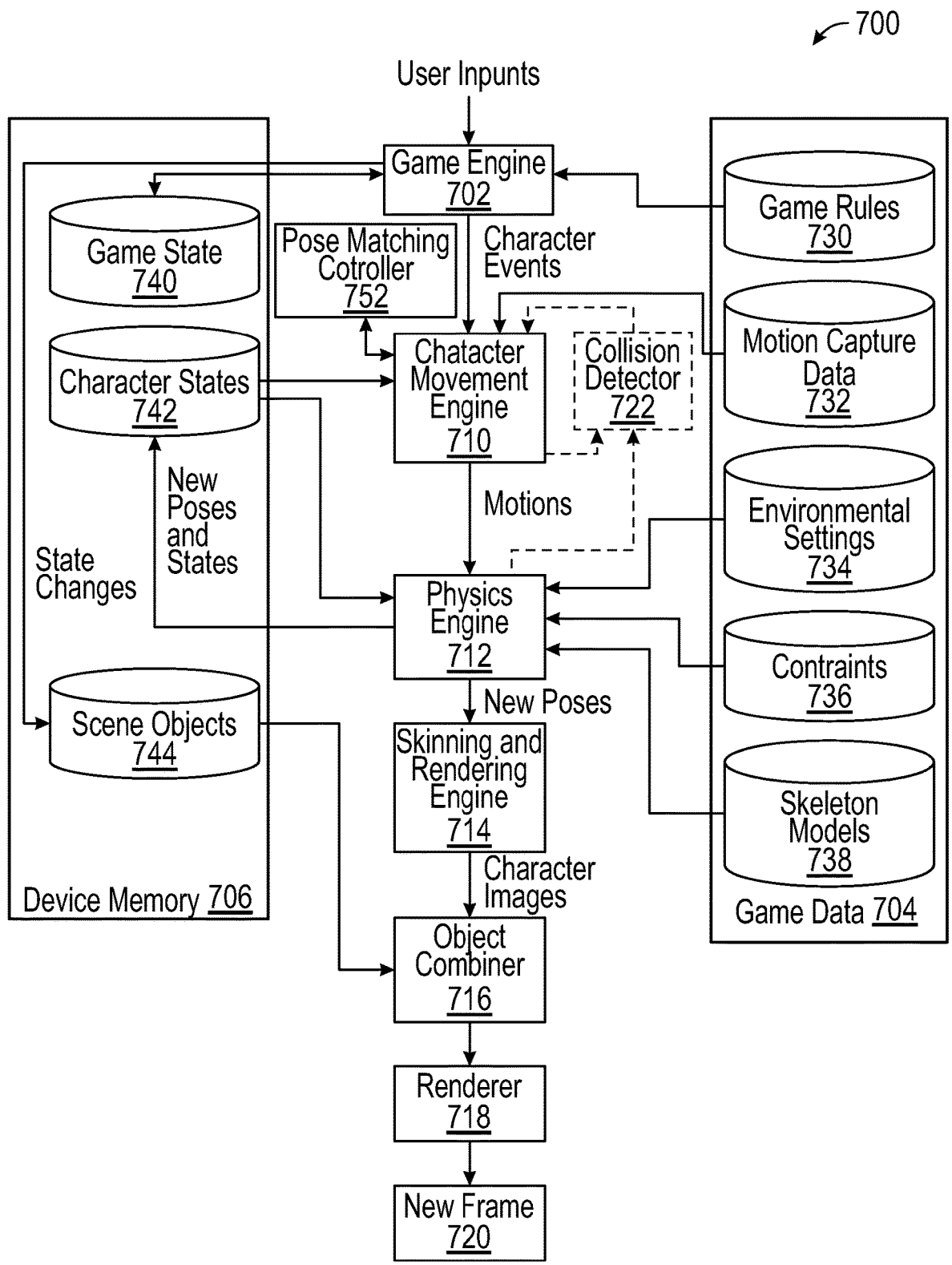
FIG. 7 illustrates implementations of some elements of a video game system in accordance with one or more implementations of the subject technology.

FIG. 7 illustrates implementations of some elements of a video game system 700 in accordance with one or more implementations of the subject technology. In particular, FIG. 7 illustrates implementations of elements involved in execution of gameplay within a game application. The game application may be executed by a user computing device, such as that described below with respect to FIGS. 8 and 9. The game system 700 may receive user input to control aspects of the game according to game rules 730. Game rules 730 may be specified in instruction form on game media. Examples of game rules 730 include rules for scoring, possible inputs, actions/events, movement in response to inputs, and the like. Other components can control what inputs are accepted and how the game progresses, and other aspects of gameplay. The elements in FIG. 7 illustrate elements used for generating and rendering animation within the game based on various inputs.

As shown in FIG. 7, by system 700, user inputs and game code/data may be used to generate display video. The game system also handles playing the game and presenting corresponding audio output. The description of FIG. 7 is focused on generating frames of display video for the game. A game engine 702 receives the user inputs and determines character events, such as actions, collisions, runs, throws, attacks and other events appropriate for the game.

The character events are conveyed to a character movement engine 710 that determines the appropriate motions the characters should make in response to the events. Further, the character movement engine 710 may generate a character pose that can be passed directly or provided to a skinning and rendering engine 714 or to a physics engine 712 for further processing. This generated character pose may be referred to as the "target pose." The physics engine 712 tracks the target pose by, for example, calculating the torques and forces necessary to make the ragdoll representation of the character follow the target pose. In calculating the torques and forces for making the ragdoll representation of the character follow the target pose, the physics engine 712 may account for or incorporate external forces and collision constraints in its calculations. A muscle system inside or communicating with the physics engine 712 may account for forces that a representation of muscles associated with the character, or its ragdoll representation, may apply in attempting to follow the target pose. By accounting for the representation of the muscles associated with the character, the physics engine 712 can determine how closely the target pose will be followed by the ragdoll. Muscle tensions for the character can be tweaked to follow the target pose loosely or closely. The physics engine 712 may generate the final character pose that may be provided to the skinning and rendering engine 714. The skinning and rendering engine 714 in turn provides character frames to an object combiner 716 to combine animate, inanimate, and background objects into a full scene. The full scene is conveyed to a renderer 718, which generates a new frame 720 therefrom.

Game code/data 704 is shown comprising game rules 730, prerecorded motion capture data 732 (e.g., poses/paths), environmental settings 734, constraints 736 (such as strength and velocity constraints), and skeleton models 738. The device executing the game might have memory 706 for game state 740, character states 742 and scene object storage 744. Character states 742 can comprise storage for a current pose of characters being animated.

During operation, the game engine 702 reads in game rules 730 and considers game state 740 to arrive at character events. Character movement engine 710 reads in prerecorded poses/paths from a motion capture data repository 732 as well as character states 742. The motion capture data repository 732 can store motion capture clips in the form of marker positions and/or a hierarchy of relative joint orientations. The pose for each frame within the collection of animation clips may be uniquely identified by a corresponding hierarchy of relative joint orientations. An optional collision detector engine 722 can detect collisions generated by the physics engine 712 and alert the game engine to the collisions, which may result in the triggering of specific game events. Further, the detection of collisions may result in a recalculation of the final pose by the physics engine 712.

In some implementations, the character movement engine 710 can work in conjunction with the physics engine 712 to create a procedural animation. In some such implementations, the physics engine 712 may generate a final pose for an object or character that differs from the target pose, in, response to, for example, a collision detected by the collision detector 722. The character pose may be generated on a frame-by-frame basis and can be based at least in part on one or more physics rules implemented by the physics engine 712. For example, the final pose may be based at least in part on the target pose provided by the character movement engine 710 and the impact of a collision force and/or a gravitational value. The character movement engine 710 can use the final pose to identify a motion capture frame included in the motion capture data 732, which may be provided as the target pose for the next frame in the procedural animation. The strength of the muscles determined by the physics engine 712 may be used to determine how closely the new target pose will be followed when generating the subsequent frame. Advantageously, in certain implementations, using the final pose to select a motion capture frame and updating the target pose for the next frame update based on the selected motion capture frame enables more fluid procedural animation compared to pre-existing processes. Further, the use of procedural animation can result in a larger variety of animation within a game while reducing storage space for the game data 704 of a game. In certain implementations, one or more of the game engine 702, the character movement engine 710, the physics engine 712, and the collision detector 722, among other systems may be configured to execute the processes discussed below with respect to FIG. 9. However, as described below, a separate computing system may be used to execute the process described with respect to FIG. 9 to create the motion capture data repository 732.

As needed, character movement engine 710 may also use other data elements shown, such as skeleton models 738, also referred to as rigs. Rigs are often used in character animations. A typical rig may comprise a collection of character components, such as a skeletal structure and a mesh to be skinned over the skeletal structure. A typical rig comprises a skeletal structure for a character and includes a plurality of degrees of freedom. A rig may also comprise a set of animation controls that enable an animator to move the various components of the character in order to create motion in an animation. Character movement engine 710 might also introduce character movements for randomness, personality, and so forth.

In certain implementations, the character movement engine 710 provides a target pose based on, game rules. For example, the game logic may select an, animation to be played, and a current frame of the animation may dictate the target pose. The physics engine 712 can receive the target pose as an input and can calculate the forces and torques to make the ragdoll representation follow the target pose. The strength of the muscles of the ragdoll may determine how closely the target pose is followed by the ragdoll when generating the procedural animation. Further, the physics engine 712 may modify the calculation of the path followed by the ragdoll based at least in part on external forces and/or collision constraints that occur with respect to the character in the video game. Thus, in some cases, even with strong muscles, the target pose may not be reached if, for example, a collision occurs or there is an obstacle in the path of one or more of the character's limbs.

The pose matching controller 752 can identify one or more frames from an animation to display based on how well a character pose from one animation matches a character pose from another animation. For example, the pose matching controller 752 can identify a number of pose features or reference features from a character in a particular animation, or a current frame from the particular animation, and determine the difference between the pose features and corresponding pose features from frames of a second animation. In some implementations, a particular frame of an animation is compared to one or more frames from another animation. For example, upon receiving a trigger to change animations, the pose matching controller 752 may compare a current frame and/or a subsequent frame to one or more frames of a new animation to be displayed. The frame from the second animation with pose features that has the smallest difference compared to the pose features of the particular animation may be selected as a start frame when transitioning from the particular animation to the second animation. Advantageously, in certain implementations, the pose matching controller 752 enables animations to appear smoother or more realistic compared to systems that start subsequent animations at the same start frame each time and/or without accounting for the frame of a the current animation when transitioning to a new animation.

The skinning and rendering engine 714 takes into account the surfaces, colors and textures of the body parts of posed characters and renders character images. Object combiner 716 can then combine the character images with inanimate and background objects obtained from scene objects storage 744 to provide a complete scene to renderer 718.

Figure 8:
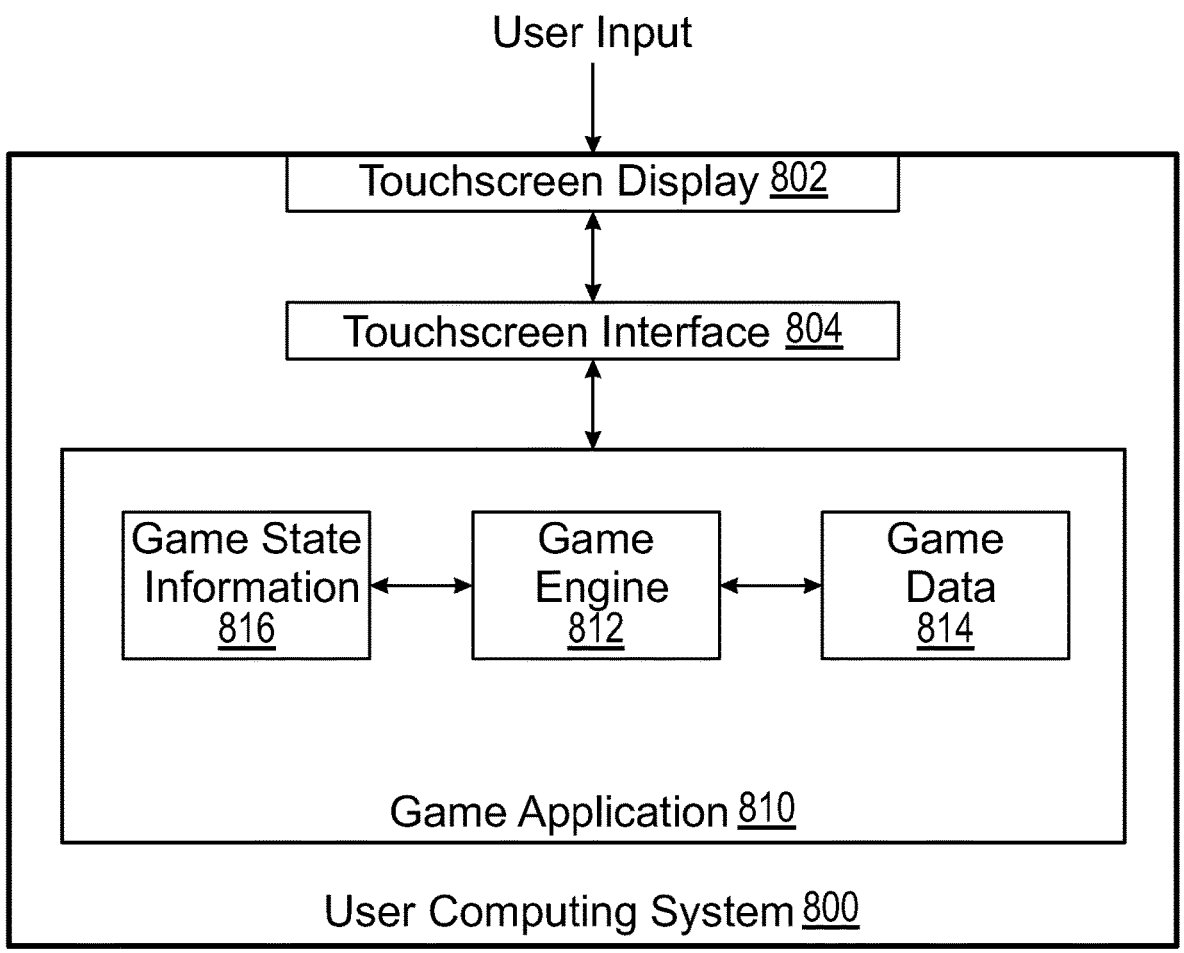
FIG. 8 illustrates an implementation of a user computing system in accordance with one or more implementations of the subject technology.

FIG. 8 illustrates an implementation of a user computing system 800, which may also be referred to as a gaming system, in accordance with one or more implementations of the subject technology. As illustrated, the user computing system 800 may be a single computing device that can include a number of elements. However, in some cases, the user computing system 800 may include multiple devices. For example, the user computing system 800 may include one device that includes that includes a central processing unit and a graphics processing unit, another device that includes a display, and another device that includes an, input mechanism, such as a keyboard or mouse.

The user computing system 800 can be an implementation of a computing system that can execute a game system, such as the game system 700 described with respect to FIG. 7. In the non-limiting example of FIG. 8, the user computing system 800 is a touch-capable computing device capable of receiving input from a user via a touchscreen display 802. However, the user computing system 800 is not limited as such and may include non-touch capable implementations, which do not include a touchscreen display 802.

The user computing system 800 includes a touchscreen display 802 and a touchscreen interface 804, and is configured to execute a game application 810. This game application may be a video game or an application that executes in conjunction with or in support of the video game, such as a video game execution environment. Further, the game application may include one or more of the features described with respect to the game system 700. Although described as a game application 810, in some implementations the application 810 may be another type of application that may include procedural animations based on motion capture data and/or that may transition between two different animations, such as educational software. While user computing system 800 includes the touchscreen display 802, it is recognized that a variety of input devices may be used in addition to or in place of the touchscreen display 802.

The user computing system 800 can include one or more processors, such as central processing units (CPUs), graphics processing units (GPUs), and accelerated processing units (APUs). Further, the user computing system 800 may include one or more data storage elements. In some implementations, the user computing system 800 can be a specialized computing device created for the purpose of executing game applications 810. For example, the user computing system 800 may be a video game console. The game applications 810 executed by the user computing system 800 may be created using a particular application programming interface (API) or compiled into a particular instruction set that may be specific to the user computing system 800. In some implementations, the user computing system 800 may be a general purpose computing device capable of executing game applications 810 and non-game applications. For example, the user computing system 800 may be a laptop with an integrated touchscreen display or desktop computer with an external touchscreen display. Components of an example implementation of a user computing system 800 are described in, more detail with respect to FIG. 9.

The touchscreen display 802 can be a capacitive touchscreen, a resistive touchscreen, a surface acoustic wave touchscreen, or other type of touchscreen technology that is configured to receive tactile inputs, also referred to as touch inputs, from a user. For example, the touch inputs can be received via a finger touching the screen, multiple fingers touching the screen, a stylus, or other stimuli that can be used to register a touch input on the touchscreen display 802. The touchscreen interface 804 can be configured to translate the touch input into data and output the data such that it can be interpreted by components of the user computing system 800, such as an operating system and the game application 810. The touchscreen interface 804 can translate characteristics of the tactile touch input touch into touch input data. Some example characteristics of a touch input can include, shape, size, pressure, location, direction, momentum, duration, and/or other characteristics. The touchscreen interface 804 can be configured to determine the type of touch input, such as, for example a tap (for example, touch and release at a single location) or a swipe (for example, movement through a plurality of locations on touchscreen in a single touch input). The touchscreen interface 804 can be configured to detect and output touch input data associated with multiple touch inputs occurring simultaneously or substantially in parallel. In some cases, the simultaneous touch inputs may include instances where a user maintains a first touch on the touchscreen display 802 while subsequently performing a second touch on the touchscreen display 802. The touchscreen interface 804 can be configured to detect movement of the touch inputs. The touch input data can be transmitted to components of the user computing system 800 for processing. For example, the touch input data can be transmitted directly to the game application 810 for processing.

In some implementations, the touch input data can undergo processing and/or filtering by the touchscreen interface 804, an operating system, or other components prior to being output to the game application 810. As one example, raw touch input data can be captured from a touch input. The raw data can be filtered to remove background noise, pressure values associated with the input can be measured, and location coordinates associated with the touch input can be calculated. The type of touch input data provided to the game application 810 can be dependent upon the specific implementation of the touchscreen interface 804 and the particular API associated with the touchscreen interface 804. In, some implementations, the touch input data can include location coordinates of the touch input. The touch signal data can be output at a defined frequency. Processing the touch inputs can be computed many times per second and the touch input data can be output to the game application for further processing.

A game application 810 can be configured to be executed on the user computing system 800. The game application 810 may also be referred to as a video game, a game, game code and/or a game program. A game application should be understood to include software code that a user computing system 800 can use to provide a game for a user to play. A game application 810 might comprise software code that informs a user computing system 800 of processor instructions to execute, but might also include data used in the playing of the game, such as data relating to constants, images and other data structures. For example, in the illustrated implementation, the game application includes a game engine 812, game data 814, and game state information 816.

The touchscreen interface 804 or another component of the user computing system 800, such as the operating system, can provide user input, such as touch inputs, to the game application 810. In some implementations, the user computing system 800 may include alternative or additional user input devices, such as a mouse, a keyboard, a camera, a game controller, and the like. A user can interact with the game application 810 via the touchscreen interface 804 and/or one or more of the alternative or additional user input devices. The game engine 812 can be configured to execute aspects of the operation of the game application 810 within the user computing system 800. Execution of aspects of gameplay within a game application can be based, at least in part, on the user input received, the game data 814, and game state information 816. The game data 814 can include game rules, prerecorded motion capture poses/paths, environmental settings, constraints, animation reference curves, skeleton models, and/or other game application information. Further, the game data 814 may include information that is used to set or adjust the difficulty of the game application 810.

The game engine 812 can execute gameplay within the game according to the game rules. Some examples of game rules can include rules for scoring, possible inputs, actions/events, movement in response to inputs, and the like. Other components can control what inputs are accepted and how the game progresses, and other aspects of gameplay. During execution of the game application 810, the game application 810 can store game state information 816, which can include character states, environment states, scene object storage, and/or other information associated with a state of execution of the game application 810. For example, the game state information 816 can identify the state of the game application at a specific point in time, such as a character position, character action, game level, attributes, and other information contributing to a state of the game application.

The game engine 812 can receive the user inputs and determine in-game events, such as actions, collisions, runs, throws, attacks and other events appropriate for the game application 810. During operation, the game engine 812 can read in game data 814 and game state information 816 in order to determine the appropriate in-game events. In one example, after the game engine 812 determines the character events, the character events can be conveyed to a movement engine that can determine the appropriate motions the characters should make in response to the events and passes those motions on to an animation engine. The animation engine can determine new poses for the characters and provide the new poses to a skinning and rendering engine. The skinning and rendering engine, in turn, can provide character images to an object combiner in order to combine animate, inanimate, and background objects into a full scene. The full scene can conveyed to a renderer, which can generate a new frame for display to the user. The process can be repeated for rendering each frame during execution of the game application. Though the process has been, described in the context of a character, the process can be applied to any process for processing events and rendering the output for display to a user.

Figure 9:
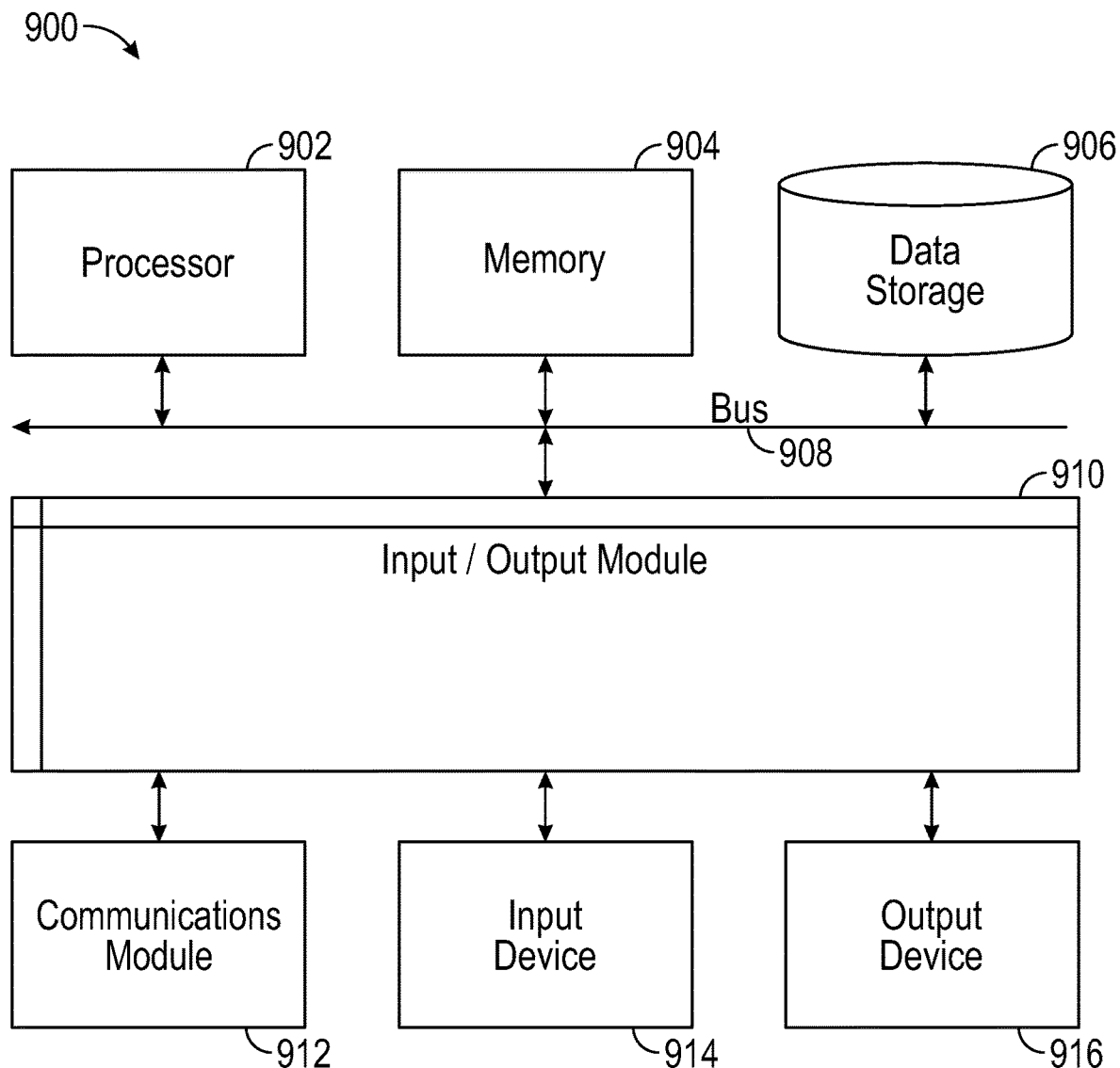
FIG. 9 is a block diagram illustrating an example computer system with which aspects of the subject technology can be implemented.

FIG. 9 is a block diagram illustrating an exemplary computer system 900 with which aspects of the subject technology can be implemented. In certain aspects, the computer system 900 may be implemented using hardware or a combination of software and hardware, either in a dedicated server, integrated into another entity, or distributed across multiple entities.

Computer system 900 (e.g., system 200, video game system 700, user computing system 800) includes a bus 908 or other communication mechanism for communicating information, and a processor 902 coupled with bus 908 for processing information. By way of example, the computer system 900 may be implemented with one or more processors 902. Processor 902 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 900 can include, in addition to hardware, code that creates an execution environment for the computer program in question, e.g., code that constitutes processor firmware, a protocol stack, a database management system, an operating system, or a combination of one or more of them stored in an included memory 904 (e.g., device memory 706), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 908 for storing information and instructions to be executed by processor 902. The processor 902 and the memory 904 can be supplemented by, or incorporated in, special purpose logic circuitry.

The instructions may be stored in the memory 904 and implemented in one or more computer program products, i.e., one or more modules of computer program instructions encoded on a computer readable medium for execution by, or to control the operation of, the computer system 900, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 904 may also be used for storing temporary variable or other intermediate information during execution of instructions to be executed by processor 902.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 900 further includes a data storage device 906 such as a magnetic disk or optical disk, coupled to bus 908 for storing information and instructions. Computer system 900 may be coupled via input/output module 910 to various devices. The input/output module 910 can be any input/output module. Exemplary input/output modules 910 include data ports such as USB ports. The input/output module 910 is configured to connect to a communications module 912. Exemplary communications modules 912 include networking interface cards, such as Ethernet cards and modems. In certain aspects, the input/output module 910 is configured to connect to a plurality of devices, such as an input device 914 (e.g., touchscreen display 802, touchscreen interface 804) and/or an output device 916 (e.g., touchscreen display 802). Exemplary input devices 914 include a keyboard and a pointing device, e.g., a mouse or a trackball, by which a user can provide input to the computer system 900. Other kinds of input devices 914 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 916 include display devices such as a LCD (liquid crystal display) monitor, for displaying information to the user.

According to one aspect of the present disclosure, each of the system 200, the video game system 700, and/or the user computing system 800 can be implemented using a computer system 900 in response to processor 902 executing one or more sequences of one or more instructions contained in memory 904. Such instructions may be read into memory 904 from another machine-readable medium, such as data storage device 906. Execution of the sequences of instructions contained in the main memory 904 causes processor 902 to perform the process steps described herein. One or more processors in a multi-processing arrangement may also be employed to execute the sequences of instructions contained in memory 904. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., communication network 208) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 900 can include clients and servers. A client and server are generally remote from each other and typically interact through a communication network. The relationship of client and server arises by virtue of computer programs running on the respective computers and having a client-server relationship to each other. Computer system 900 can be, for example, and without limitation, a desktop computer, laptop computer, or tablet computer. Computer system 900 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 902 for execution. Such a medium may take many forms, including, but not limited to, non-volatile media, volatile media, and transmission media. Non-volatile media include, for example, optical or magnetic disks, such as data storage device 906. Volatile media include dynamic memory, such as memory 904. Transmission media include coaxial cables, copper wire, and fiber optics, including the wires that comprise bus 908. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 800 reads the game data 814 and provides a game, information may be read from the game data 814 and stored in a memory device, such, as the memory 904. Additionally, data from the memory 904, servers accessed via a network (e.g., communication network 208) through the bus 908, or the data storage 906 may be read and loaded into the memory 904. Although data is described as being found in the memory 904, it will be understood that data does not have to be stored in the memory 904 and may be stored in other memory accessible to the processor 902 or distributed among several media, such as the data storage 906.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include", "have", or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration". Any embodiment described herein as "exemplary" is not necessarily to be construed as preferred or advantageous over other embodiments.

A reference to an element in the singular is not intended to mean "one and only one" unless specifically stated, but rather "one or more". All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for motion capture, comprising:
   recording, through a video capture system comprising at least one camera and at least one display device, a first scene with at least one actor, the first scene comprising a first video of a first set of movements of the at least one actor;
   displaying, through the at least one display device of the video capture system, a second video of the first scene with the at least one actor, the second video comprising a live video of a first take of a second set of movements of the at least one actor, the second set of movements correlating with the first set of movements;
   combining, through a user interface of the video capture system, the first video with the second video to obtain a combined video, the combined video comprising the first set of movements and the second set of movements, the first set of movements of the respective at least one actor displayed differently than the live video of the first take of the second set of movements;
   displaying, through the at least one display device of the video capture system, the combined video of the first set of movements displayed differently than the live video of the second set of movements, the displaying of the combined video enabling a comparison of the second set of movements in the first take with the first set of movements;
   recording, through the video capture system, a final video comprising a second take of the second set of movements based on the comparison of the second set of movements with the first set of movements; and
   deleting, from the final video, actor data of the at least one actor in at least a portion of the first scene.

2. The computer-implemented method of claim 1, further comprising:
   monitoring the first video and the second video to ensure correlation of the first set of movements with the second set of movements.

3. The computer-implemented method of claim 1, wherein the combining comprises:
   tiling the first video with the second video.

4. The computer-implemented method of claim 1, further comprising:
   obtaining a third video with the at least one actor, the third video comprising a third set of movements of the at least one actor, the third set of movements correlating with the first set of movements and the second set of movements.

5. The computer-implemented method of claim 4, further comprising:
   combining the third video with the first video and the second video to obtain the combined video.

6. The computer-implemented method of claim 1, wherein obtaining the second video comprises:
   adjusting the second set of movements to correlate with the first set of movements.

7. The computer-implemented method of claim 1, further comprising:
   translating the combined video into an animated sequence.

8. The method of claim 1, wherein the at least one actor portrays a first character in the first video and a second character in the second video, the first character different from the second character.

9. A system for motion capture, comprising:
   a processor; and
   a memory comprising instructions stored thereon, which when executed by the processor, causes the processor to perform:
   recording, through a video capture system comprising at least one camera and at least one display device, a first scene with at least one actor, the first scene comprising a first video of a first set of movements of the at least one actor;
   displaying, through the at least one display device of the video capture system, a second video of the first scene with the at least one actor, the second video comprising a live video of a first take of a second set of movements of the at least one actor, the second set of movements correlating with the first set of movements;

combining, through a user interface of the video capture system, the first video with the second video to obtain a combined video, the combined video comprising the first set of movements and the second set of movements, the first set of movements of the respective at least one actor displayed differently than the live video of the first take of the second set of movements;

displaying, through the at least one display device of the video capture system, the combined video of the first set of movements displayed differently than the live video of the second set of movements, the displaying of the combined video enabling a comparison of the second set of movements in the first take with the first set of movements;

recording, through the video capture system, a final video comprising a second take of the second set of movements based on the comparison of the second set of movements with the first set of movements; and deleting, from the final video, actor data of the at least one actor in at least a portion of the first scene.

10. The system of claim 9, further comprising stored sequences of instructions, which when executed by the processor, cause the processor to perform:

monitoring the first video and the second video to ensure correlation of the first set of movements with the second set of movements.

11. The system of claim 9, further comprising stored sequences of instructions, which when executed by the processor, cause the processor to perform:

tiling the first video with the second video.

12. The system of claim 9, wherein the combining comprises:

obtaining a third video with the at least one actor, the third video comprising a third set of movements of the at least one actor, the third set of movements correlating with the first set of movements and the second set of movements.

13. The system of claim 12, further comprising stored sequences of instructions, which when executed by the processor, cause the processor to perform:

combining the third video with the first video and the second video to obtain the combined video.

14. The system of claim 9, further comprising stored sequences of instructions, which when executed by the processor, cause the processor to perform:

adjusting the second set of movements to correlate with the first set of movements.

15. The system of claim 9, further comprising stored sequences of instructions, which when executed by the processor, cause the processor to perform:

translating the combined video into an animated sequence.

16. A non-transitory computer readable storage medium is provided including instructions that, when executed by a processor, cause the processor to perform a method for motion capture, comprising:

recording, through a video capture system comprising at least one camera and at least one display device, a first scene with at least one actor, the first scene comprising a first video of a first set of movements of the at least one actor;

displaying, through the at least one display device of the video capture system, a second video of the first scene with the at least one actor, the second video comprising a live video of a first take of a second set of movements of the at least one actor, the second set of movements correlating with the first set of movements;

combining, through a user interface of the video capture system, the first video with the second video to obtain a combined video, the combined video comprising the first set of movements and the second set of movements, the first set of movements of the respective at least one actor displayed differently than the live video of the first take of the second set of movements;

displaying, through the at least one display device of the video capture system, the combined video of the first set of movements displayed differently than the live video of the second set of movements, the displaying of the combined video enabling a comparison of the second set of movements in the first take with the first set of movements;

recording, through the video capture system, a final video comprising a second take of the second set of movements based on the comparison of the second set of movements with the first set of movements; and deleting, from the final video, actor data of the at least one actor in at least a portion of the first scene.

17. The non-transitory computer readable storage medium of claim 16, wherein the method further comprises:

monitoring the first video and the second video to ensure correlation of the first set of movements with the second set of movements.

18. The non-transitory computer readable storage medium of claim 16, wherein the method further comprises:

tiling the first video with the second video.

19. The non-transitory computer readable storage medium of claim 16, wherein the method further comprises:

obtaining a third video with the at least one actor, the third video comprising a third set of movements of the at least one actor, the third set of movements correlating with the first set of movements and the second set of movements.

20. The non-transitory computer readable storage medium of claim 19, wherein the method further comprises:

combining the third video with the first video and the second video to obtain the combined video.

21. The non-transitory computer readable storage medium of claim 16, wherein the method further comprises:

adjusting the second set of movements to correlate with the first set of movements.

* * * * *